United States Patent
Madhavan et al.

(10) Patent No.: US 11,258,865 B2
(45) Date of Patent: Feb. 22, 2022

(54) AUTOMATED INTEGRATION WITH CLOUD-BASED SERVICES

(71) Applicant: ServiceNow, Inc., Santa Clara, CA (US)

(72) Inventors: Ashok Madhavan, Pleasanton, CA (US); Shantanu Kumar Singh, Bangalore (IN); Utpal Thakrar, Goleta, CA (US); Mihir Shaileshbhai Gandhi, Milpitas, CA (US); Yuedong Huang, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 74 days.

(21) Appl. No.: 16/368,690

(22) Filed: Mar. 28, 2019

(65) Prior Publication Data
US 2020/0314191 A1    Oct. 1, 2020

(51) Int. Cl.
*G06F 15/16* (2006.01)
*H04L 67/51* (2022.01)
*G06F 16/22* (2019.01)
*G06Q 10/10* (2012.01)
(Continued)

(52) U.S. Cl.
CPC .......... *H04L 67/16* (2013.01); *G06F 16/2282* (2019.01); *G06F 3/04847* (2013.01); *G06Q 10/1053* (2013.01); *H04L 63/08* (2013.01)

(58) Field of Classification Search
CPC ..... H04L 41/22; H04L 41/12; H04L 41/0853; H04L 41/0213; G06N 20/00
See application file for complete search history.

(56) References Cited

U.S. PATENT DOCUMENTS

| 5,978,594 A | 11/1999 | Bonnell |
| 6,321,229 B1 | 11/2001 | Goldman |
| 6,609,122 B1 | 8/2003 | Ensor |

(Continued)

OTHER PUBLICATIONS

"ServiceNow London IT Operations Management", ServiceNow Docs, Mar. 12, 2019, 88 pages.
(Continued)

*Primary Examiner* — Brian Whipple
*Assistant Examiner* — Gregory P Tolchinsky
(74) *Attorney, Agent, or Firm* — Fletcher Yoder PC

(57) ABSTRACT

A computational instance of a remote network management platform may be dedicated to a managed network. The managed network may use computing resources of a cloud-based service provider. One or more processors may be disposed within the computational instance and may cause a provider-neutral cloud discovery software application to: (i) obtain a specification that defines an interface for accessing the cloud-based service provider, a discoverable set of computing resources provided by the cloud-based service provider, and mappings between descriptions of the discoverable set of computing resources and the database tables disposed within the computational instance, (ii) log on to the cloud-based service provider by way of the interface, (iii) request and receive, from the cloud-based service provider, descriptions of the discoverable set of computing resources, and (iv) store, in fields of database tables, the descriptions of the discoverable set of computing resources in accordance with the mappings.

19 Claims, 23 Drawing Sheets

(51) Int. Cl.
*H04L 29/06* (2006.01)
*G06F 3/04847* (2022.01)

(56) References Cited

U.S. PATENT DOCUMENTS

| | | | |
|---|---|---|---|
| 6,799,189 B2 | 9/2004 | Huxoll | |
| 6,816,898 B1* | 11/2004 | Scarpelli | H04L 41/50 |
| | | | 709/223 |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,716,353 B2 | 5/2010 | Golovinsky | |
| 7,769,718 B2 | 8/2010 | Murley | |
| 7,783,744 B2 | 8/2010 | Garg | |
| 7,877,783 B1* | 1/2011 | Cline | H04L 41/00 |
| | | | 726/2 |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,941,506 B2 | 5/2011 | Bonal | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,224,683 B2 | 7/2012 | Manos | |
| 8,266,096 B2 | 9/2012 | Navarrete | |
| 8,346,752 B2 | 1/2013 | Sirota | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,983 B2 | 2/2014 | Myers | |
| 8,674,992 B2 | 3/2014 | Poston | |
| 8,683,032 B2 | 3/2014 | Spinelli | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 9,967,162 B2 | 5/2018 | Spinelli | |
| 10,002,203 B2 | 6/2018 | George | |
| 2006/0136459 A1* | 6/2006 | Trinon | G06Q 10/06 |
| 2012/0096149 A1* | 4/2012 | Sunkara | G06F 9/5072 |
| | | | 709/224 |
| 2012/0290726 A1* | 11/2012 | Brown | G06F 9/5072 |
| | | | 709/226 |
| 2017/0093625 A1* | 3/2017 | Pera | H04L 43/08 |
| 2017/0310547 A1* | 10/2017 | Lin | G06F 16/22 |
| 2018/0123935 A1* | 5/2018 | Ezer | H04L 43/10 |
| 2018/0321654 A1 | 11/2018 | Tucker | |
| 2019/0104024 A1* | 4/2019 | Biran | H04L 41/5032 |
| 2019/0253251 A1* | 8/2019 | Kobayashi | H04L 9/3213 |
| 2020/0044940 A1* | 2/2020 | Thomasson | H04L 41/22 |

OTHER PUBLICATIONS

"ServiceNow London Platform Capabilities", ServiceNow Docs, Mar. 12, 2019, 354 pages.
"Amazon Relational Database Service"; Amazon API Reference; Oct. 31, 2014, 563 pages.
Nelson, U.S. Appl. No. 16/133,438, filed Sep. 17, 2018, 43 pages.

* cited by examiner

| Offboarding | Status: Draft | App: User Management | Edit | Test | Copy | Save | Activate |

| | State | Start time | Duration |
|---|---|---|---|
| Action 1. Look up records in [sc_request] when requested for is Trigger->[sys_user] Record | Complete | 09:08:15 | 120ms |
| 2. For each item in 1->[sc_request] Records | Complete | 09:08:15 | 2195ms |
|    2.1. Update 2->[sc_request] Record (Request state->Closed cancelled, Comments->"User no longer with company") | Complete | 09:08:16 | 796ms |
| Action 3. Look up records in [task] when assigned to is Trigger->[sys_user] Record | Complete | 09:08:17 | 43ms |
| 4. For each item in 3->[task] Records | Complete | 09:08:17 | 338ms |
|    4.1. Update 4->[task] Record (Assigned to->Trigger->[sys_user]->Manager) | Complete | 09:08:17 | 70ms |

1100 — OBTAINING, BY A PROVIDER-NEUTRAL CLOUD DISCOVERY SOFTWARE APPLICATION, A SPECIFICATION RELATED TO A REMOTE NETWORK, WHEREIN THE PROVIDER-NEUTRAL CLOUD DISCOVERY SOFTWARE APPLICATION IS EXECUTABLE ON ONE OR MORE PROCESSORS DISPOSED WITHIN A COMPUTATIONAL INSTANCE OF A REMOTE NETWORK MANAGEMENT PLATFORM, WHEREIN THE COMPUTATIONAL INSTANCE IS DEDICATED TO A MANAGED NETWORK, WHEREIN PERSISTENT STORAGE DISPOSED WITHIN THE COMPUTATIONAL INSTANCE CONTAINS REPRESENTATIONS OF DISCOVERED CONFIGURATION ITEMS RELATED TO THE MANAGED NETWORK IN DATABASE TABLES, AND WHEREIN THE SPECIFICATION DEFINES AN INTERFACE FOR ACCESSING THE REMOTE NETWORK, A DISCOVERABLE SET OF COMPUTING RESOURCES OF A COMPUTING SERVICE PROVIDED BY THE REMOTE NETWORK, AND MAPPINGS BETWEEN (I) DESCRIPTIONS OF THE DISCOVERABLE SET OF COMPUTING RESOURCES, AND (II) FIELDS OF THE DATABASE TABLES;

1102 — LOGGING ON TO, BY THE PROVIDER-NEUTRAL CLOUD DISCOVERY SOFTWARE APPLICATION, THE REMOTE NETWORK BY WAY OF THE INTERFACE

1104 — REQUESTING AND RECEIVING, BY THE PROVIDER-NEUTRAL CLOUD DISCOVERY SOFTWARE APPLICATION AND FROM THE REMOTE NETWORK, THE DESCRIPTIONS OF THE DISCOVERABLE SET OF COMPUTING RESOURCES

1106 — STORING, BY THE PROVIDER-NEUTRAL CLOUD DISCOVERY SOFTWARE APPLICATION AND IN THE FIELDS OF THE DATABASE TABLES, THE DESCRIPTIONS OF THE DISCOVERABLE SET OF COMPUTING RESOURCES IN ACCORDANCE WITH THE MAPPINGS.

FIG. 11

AUTOMATED INTEGRATION WITH CLOUD-BASED SERVICES

BACKGROUND

Cloud computing providers can make computing resources (e.g., databases, virtual machines, software applications, and/or other resources) remotely available to users statically or on demand. Typically, these computing resources can be accessed via a cloud service offered by the cloud computing providers. Interaction between users and cloud services may occur by way of the Internet.

An example user can be an enterprise. The enterprise may make use of cloud services to support operations such as file sharing, workflow management, database planning, and so on. By using cloud services, the enterprise can avoid or reduce infrastructure costs associated with maintaining computing resources. Further, as needs of the enterprise change, the enterprise can utilize new cloud services or upgraded cloud services offered by cloud computing providers to support additional operations.

SUMMARY

Cloud discovery can involve determining the cloud services of a cloud-based provider that are available to a managed network. From such a discovery process, representations of computing resources supported by these cloud services may be stored in a database as configuration items. These configuration items may then be used as the basis of information technology service and operations management, software asset management, and/or a variety of other network services and operations.

In some cases, initiating cloud discovery involves interacting with a remote network management platform that administers the managed network. As part of its application code, the remote network management platform may have pre-configured interfaces for interacting with cloud services. For instance, the remote network management platform may contain application programming interface (API) endpoints for cloud services available to and/or used by the managed network. Consequently, initiating cloud discovery may involve prompting the remote network management platform to make use of these pre-configured interfaces.

Nonetheless, configuring the remote network management platform to integrate a new cloud service may be challenging. Such integration may involve a team of application developers creating custom software to incorporate the new cloud service into the application code of the remote network management platform. This process may take weeks or even months, as the development process may involve rigorous testing.

The present disclosure provides an improvement to a remote network management platform that can address these and other issues. In particular, a remote network management platform may include a customizable workflow to automatically discover and interact with cloud services. During execution, the workflow can be populated with data from a specification provided by the managed network. Such data can include details for interacting with cloud services available to and/or used by the managed network. Advantageously, if managed network were to integrate a new cloud service, no additional software updates to the remote network management platform may be necessary. Rather, the managed network may simply update the specification, for example via a graphical user interface (GUI), and the workflow can be restructured accordingly. Using this framework, support for discovering new cloud services can be rapidly added to a remote network management platform, allowing an enterprise to quickly adopt the operations provided by the new cloud services.

Accordingly, a first example embodiment may involve persistent storage disposed within a computational instance of a remote network management platform, where the computational instance is dedicated to a managed network. The persistent storage may contain representations of discovered configuration items related to the managed network in database tables. The computational instance may include one or more processors configured to cause a provider-neutral cloud discovery software application to obtain a specification related to a remote network, where the specification defines an interface for accessing the remote network, a discoverable set of computing resources of a computing service provided by the remote network, and mappings between (i) descriptions of the discoverable set of computing resources, and (ii) fields of the database tables. The one or more processors may further be configured to cause the provider-neutral cloud discovery software to log on to the remote network by way of the interface. The one or more processors may further be configured to cause the provider-neutral cloud discovery software to request and receive, from the remote network, the descriptions of the discoverable set of computing resources. The one or more processors may further be configured to cause the provider-neutral cloud discovery software to store, in the fields of the database tables, the descriptions of the discoverable set of computing resources in accordance with the mappings.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, 6C, 6D, 6E, 6F, 6G, 6H, 6I, 6J, and 6K depict workflow design tool graphical user interfaces, in accordance with example embodiments.

FIG. 11 is a flow chart, in accordance with example embodiments.

DETAILED DESCRIPTION

Figure 1:
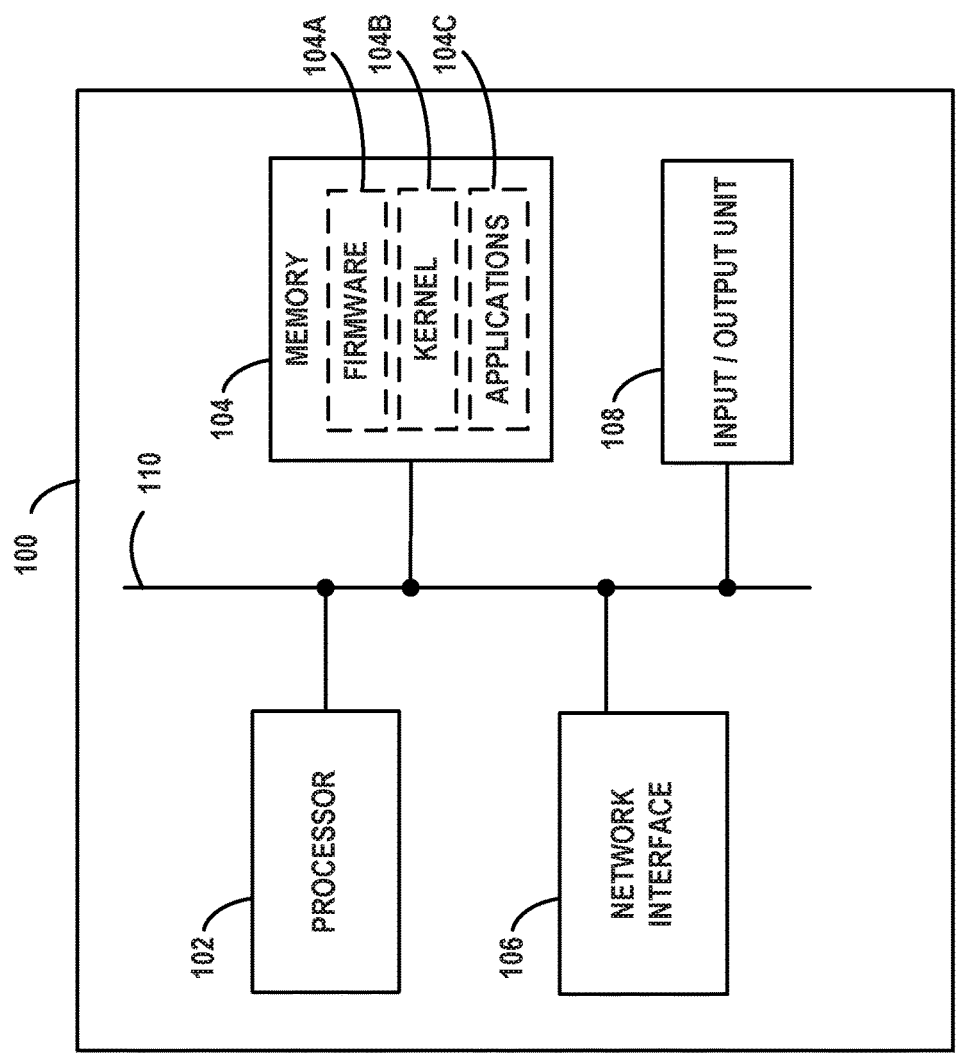
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on.

Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
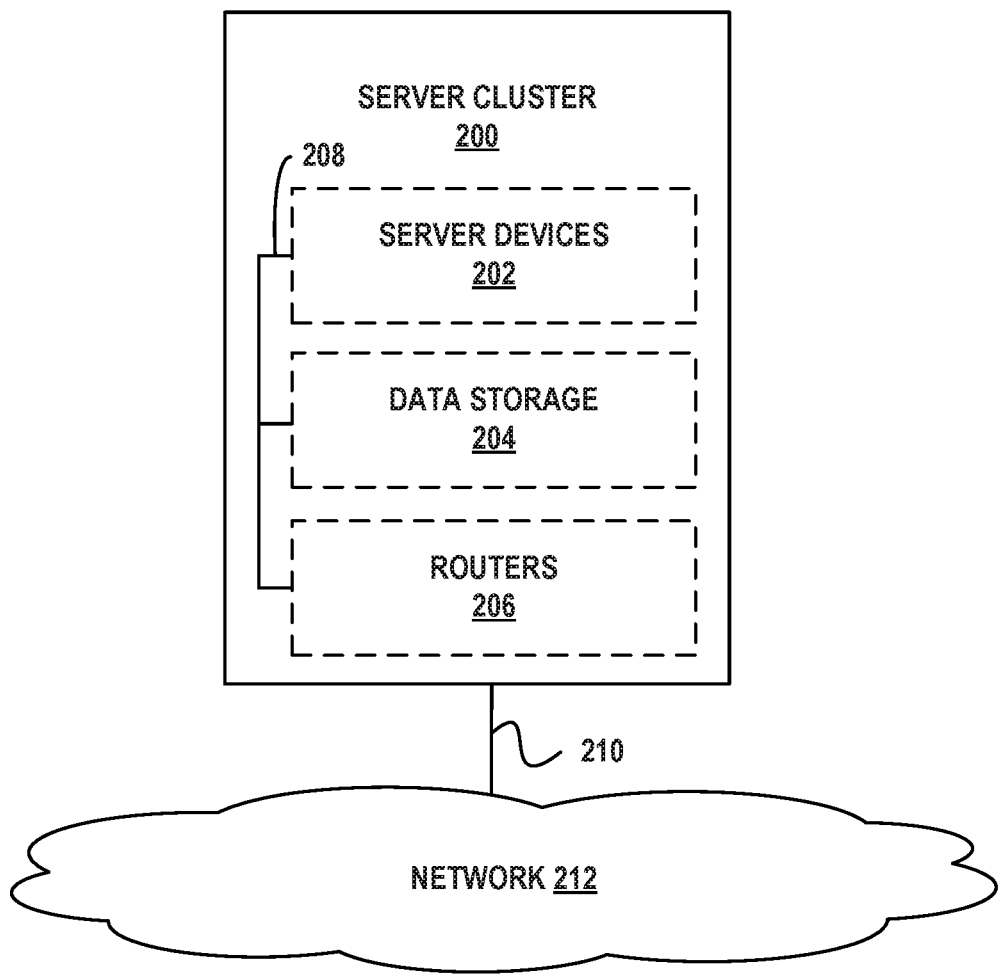
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
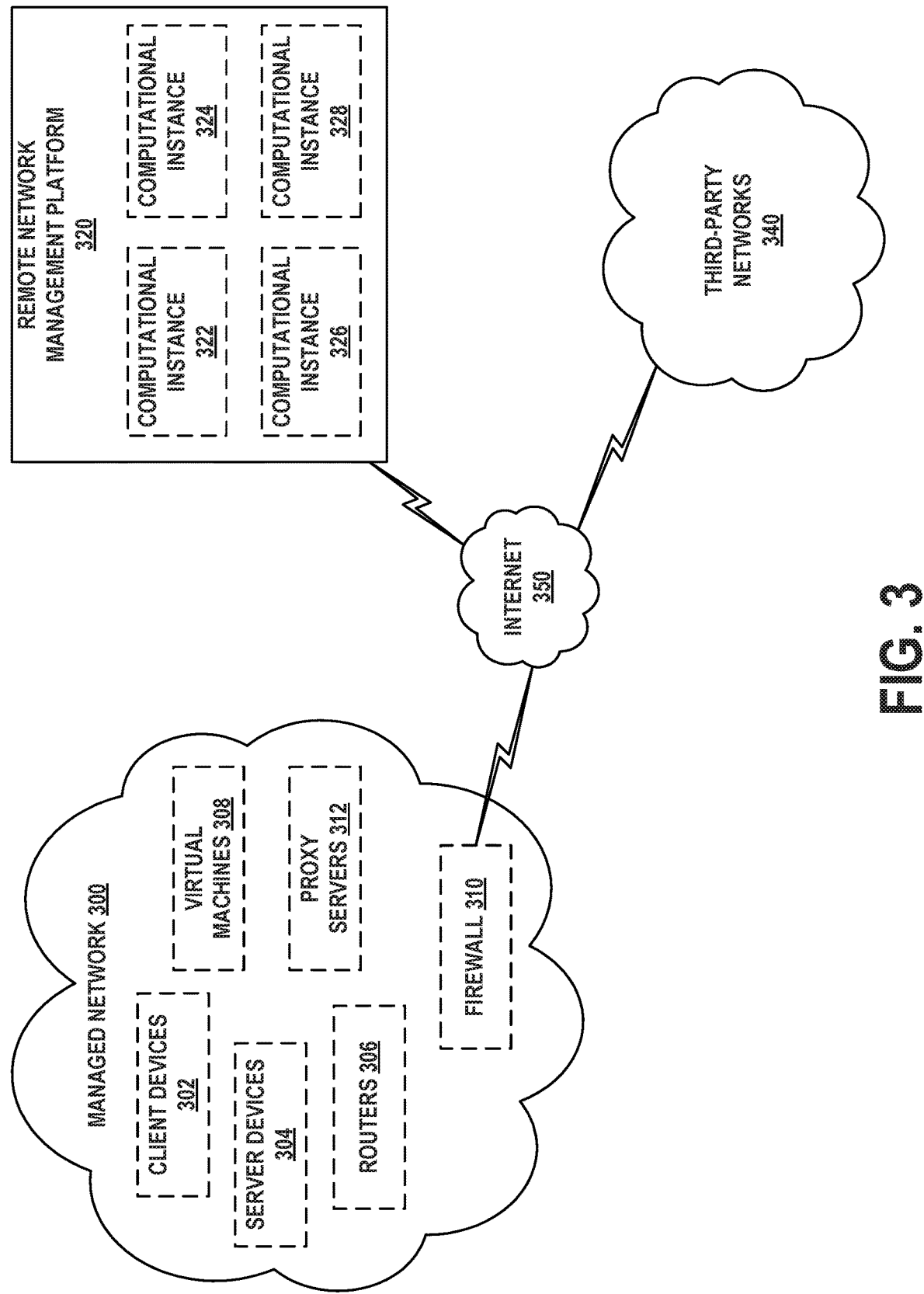
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
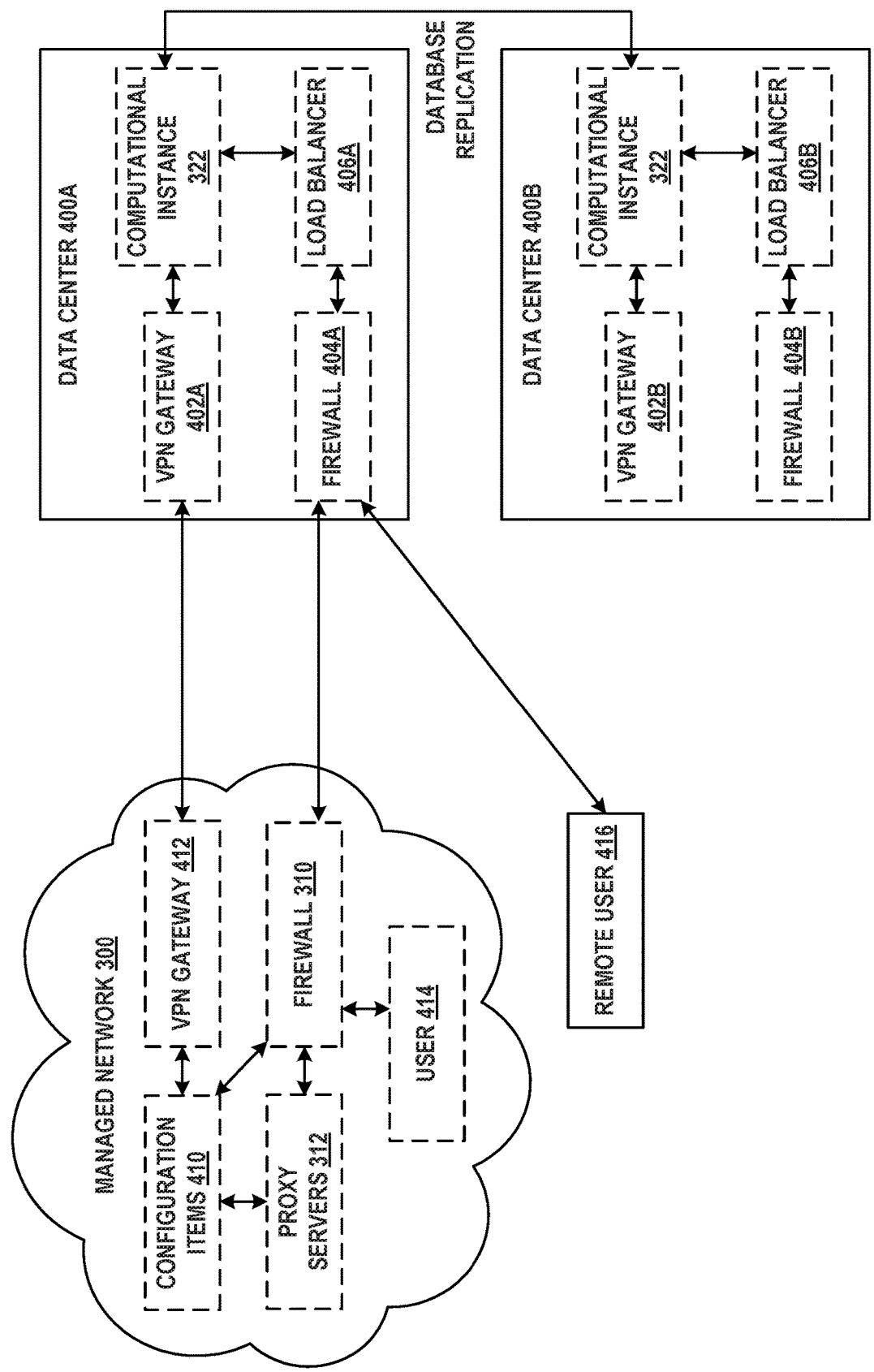
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
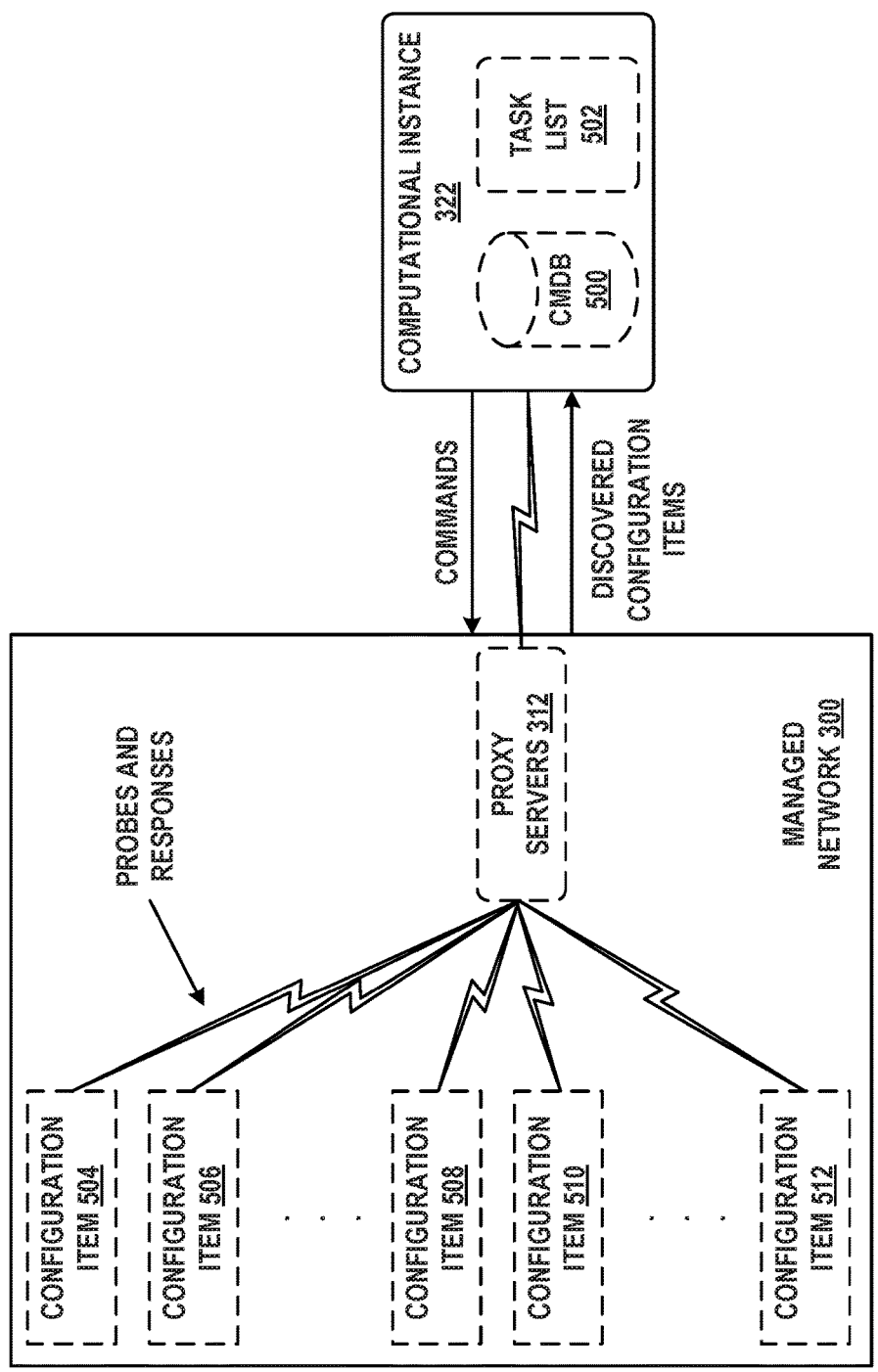
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
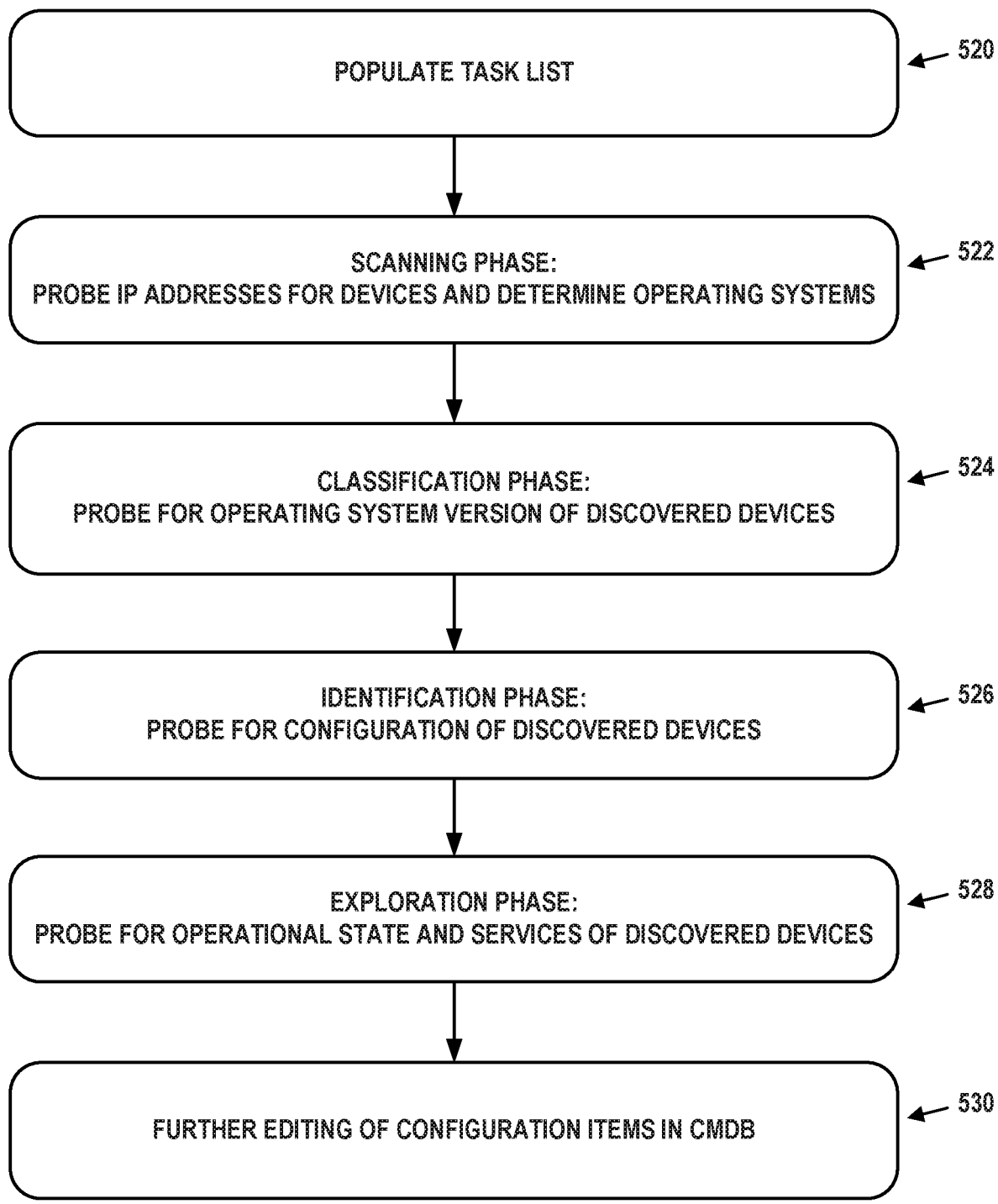
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Workflow Design Tool

Computational instances of the remote network management platform discussed herein may enable the specification and execution of workflows on behalf of their respective managed networks. A workflow is a specific sequence or series of tasks that, when performed, accomplish one or more goals. In some cases, workflows may be represented as flow charts, with one or more starting states, intermediate states, and ending states connected by various transitions therebetween. Some states may be visited zero times or more than one time. Also, some states may have more than one possible next state, thus representing a decision to be made in the workflow, either based on user input, automated input, information stored in a database, or by way of other mechanisms. Triggers may also be defined that cause certain transitions between states, input to be acquired, or output to be produced.

Such a workflow can be implemented on a computational instance through use of a software-based workflow design tool. Such a tool presents the workflow designer with options for defining the states, transitions, triggers, actions, input data, output data, and other characteristics of the workflow. The tool may utilize a GUI, and may be embodied as a series of one or more web pages and/or web-based applications deployed upon the computational instance. Once completed and released, employees of the managed network may make use of the workflow to carry out various tasks in an organized and efficient fashion. Notably, the workflow design tool can be a so-called "low-code/no-code" solution, with which designers either write very little program code, or no code at all, to implement the workflow.

While the embodiments herein provide for support for general workflow design, an example workflow design tool may be implemented based around specific definitions of triggers, actions, and workflow logic. Triggers may be used to specify conditions that start a workflow, such as a change to an entry in a database (e.g., the addition or updating of a configuration item in a CMDB) or according to a schedule (e.g., once per day or once per week). A trigger causes one or more actions to be performed, and each action may be controlled by workflow logic that specifies the conditions that must be true for the action to be performed. The action may involve changing the state of information in a database, sending a notification (e.g., an email) to a user, and so on.

In some cases, sub-flows may be defined and incorporated into a workflow. A sub-flow may be an automated or semi-automated process including a sequence of reusable actions and specific data inputs that allow it to be started from within a flow, another sub-flow, or script. Thus, sub-flows can be applied to multiple workflows.

As an illustrative example of a workflow, consider an employee offboarding scenario, in which an employee has left an enterprise for some reason (e.g., the employee quit, got fired, passed away, etc.). The goals of the workflow are to: (i) look up and cancel any pending catalog requests (e.g., equipment requisitions) opened by the departed employee, and (ii) reassign any open tasks (e.g., pending approvals, units of work that are to be accomplished) assigned to the departed employee to his or her manager. In various embodiments, more or fewer goals may be present.

Figure 6A:
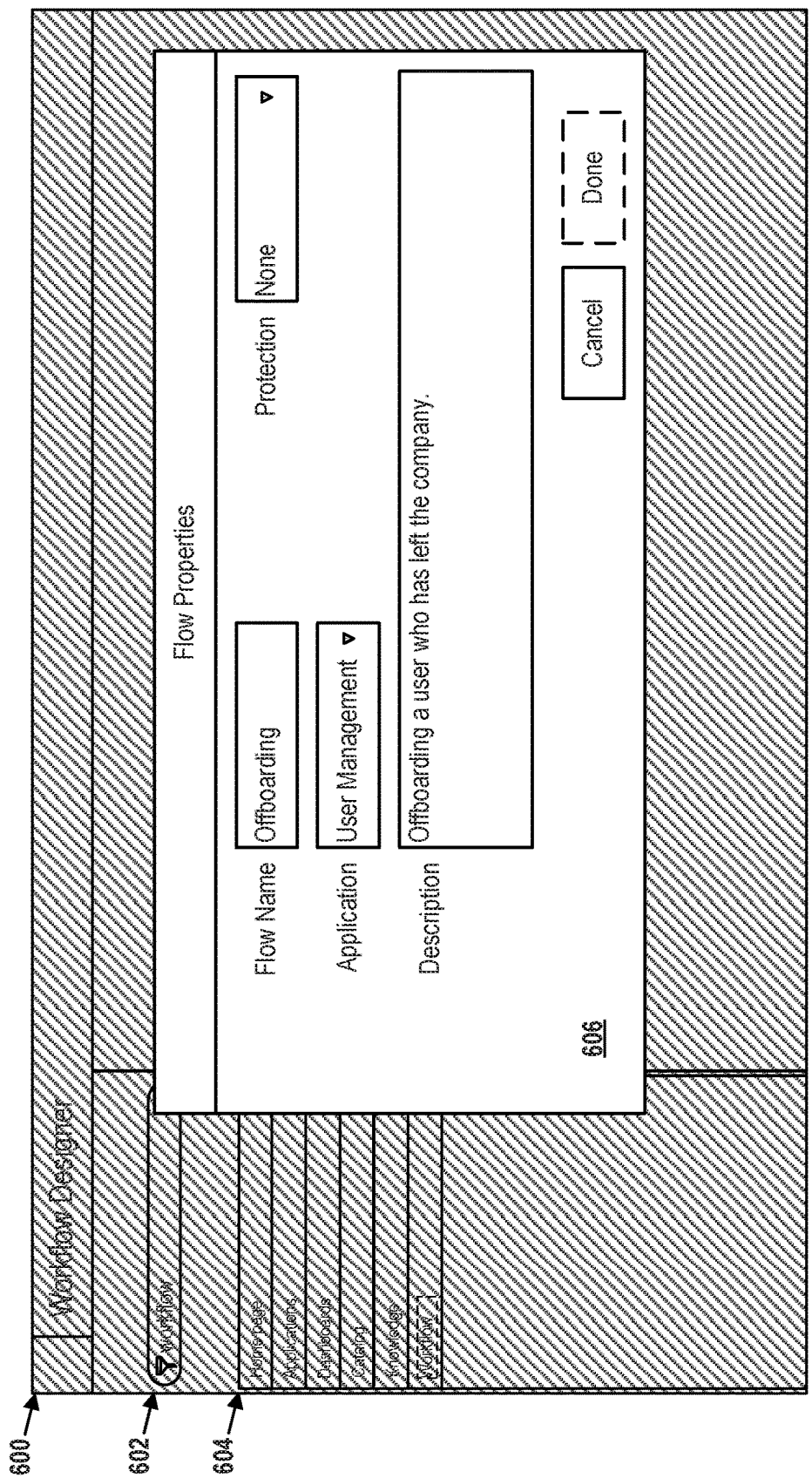

The workflow design tool may present the designer with a series of GUI pages that allow the designer to specify the workflow. Examples of such pages are shown in FIGS. 6A-6J, while results of an automated test of the workflow are shown in FIG. 6K. Notably, these examples are merely for purposes of illustration and not intended to be limiting. The workflow design tool may be able to provide other GUIs including alternative arrangements of information usable for designing workflows.

FIG. 6A depicts GUI 600. The background of GUI 600 shows a web-based menu for selecting features and/or applications supported by a computational instance. This background is denoted as such by hash marks.

For example, GUI 600 includes dialog box 602 in which a user has entered the search term "workflow". This selects the workflow design tool from the bottom of menu 604. This selection is reflected by the text "Workflow Designer" appearing at the top of GUI 600.

GUI 600 also includes pop up window 606. Alternatively, window 606 may be a pane overlaid on top of GUI 600 and not a separate window. Regardless, window 606 allows a user to initiate creation of a new workflow by specifying its properties. In GUI 600, these properties are the workflow's name "Offboarding", the workflow's scoped application "User Management", the workflow's description "Offboarding a user who has left the company", and whether the workflow is to be protected. In alternative embodiments more or fewer properties may be specified.

The workflow's name may be free-form text entered by the user. The workflow's scoped application may be selected from a drop-down menu of applications or specified as global. As the workflow in GUI 600 is limited to the "User Management" scoped application, this workflow may be considered to be part of this application. The workflow's description may also be free-form text. The workflow's protection specifies whether it is modifiable ("none") or read-only ("read-only") by other workflow designers or users.

Once the user is satisfied with the information entered in window 606, the user may select or otherwise activate the "Done" button. This selection is denoted in FIG. 6A by this button being depicted with a dashed line. Once the user completes the dialog of window 606, the next phase of the workflow design tool, which allows the user to specify a trigger, may be displayed.

Figure 6B:
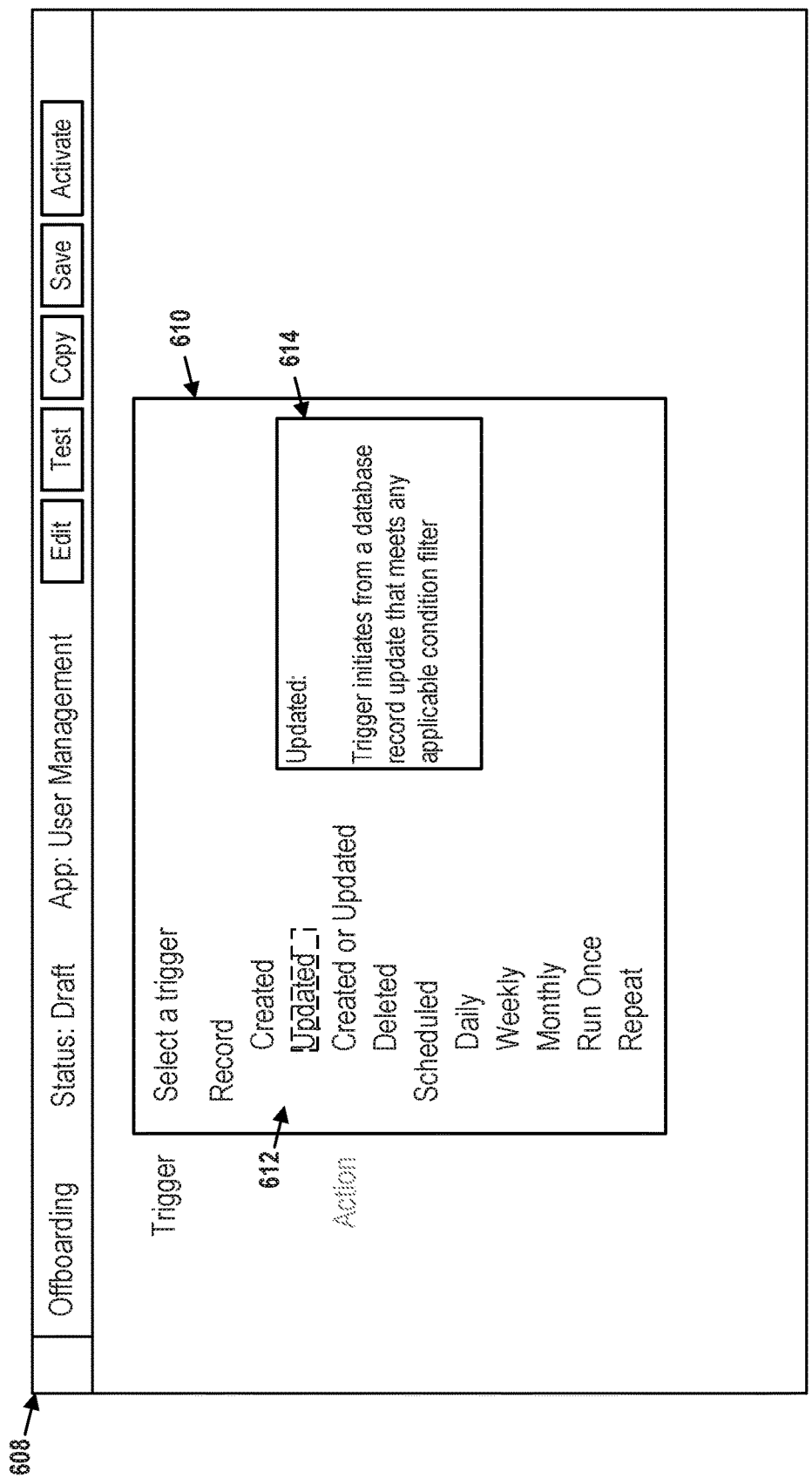

FIG. 6B depicts the first part of the trigger specification phase in GUI 608. The top of GUI 608 specifies the workflow's name, "Offboarding", as entered into window 606. This section of GUI 608 also indicates that this workflow is currently in draft form and is part of the "User Management" scoped application. GUI 608 further displays a series of buttons that allow a user to edit, test, copy, save, and activate the workflow, respectively. In alternative embodiments, different types of information about the workflow may be displayed, and there may be more or fewer buttons potentially with different functionality.

Notably, hashmarks are omitted from the background of GUI 608 (as well as all further GUIs) for purposes of readability. Also, the word "Trigger" is shown in a regular, dark color to indicate that a trigger is being specified, while the word "Action" is shown in a lighter color to indicate that action specification is not taking place.

Pop up window 610 (which, like window 606, may be a pane overlaid on top of GUI 608 and not a separate window), may allow a user to specify a trigger for the workflow. As noted previously, two main types of triggers may be supported and these types are shown in menu 612. Record-based triggers may cause a workflow to be performed when a change to one or more specific database records occurs. As depicted in menu 612, these changes may include creation of a record, updating of a record, creation or updating of a record, and deletion of a record. Scheduled triggers may cause a workflow to be performed at one or more specified times. As depicted in menu 612, such a schedule may trigger a workflow daily, weekly, monthly, just once (at a specified time), or to repeat at a user-specified interval.

In FIG. 6B, menu 612 indicates, with a dashed line, that the user has selected a trigger for when a record is updated. This may cause information box 614 to be displayed, which explains the behavior of the selected trigger.

Figure 6C:
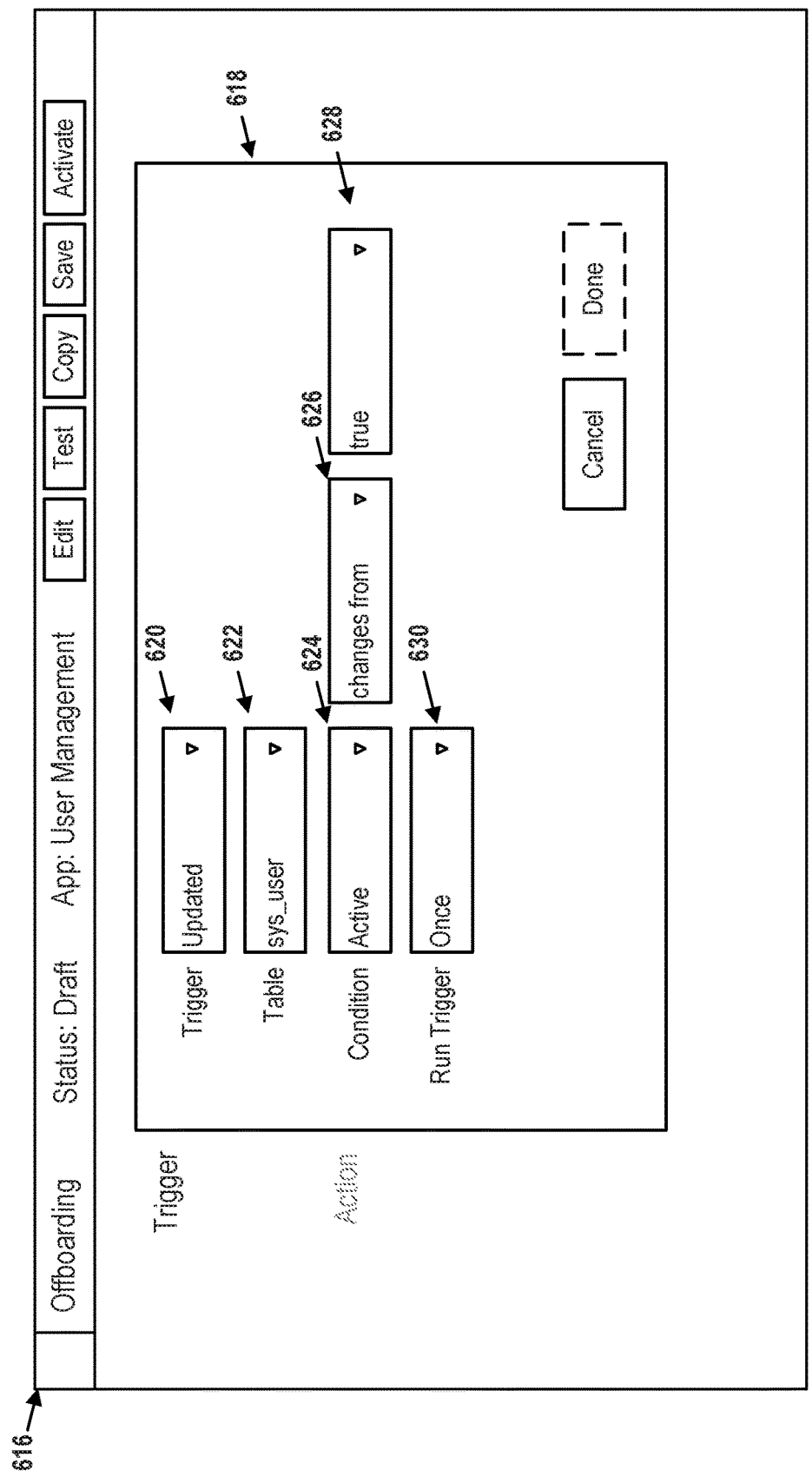

FIG. 6C depicts the second part of the trigger specification phase in GUI 616. GUI 616 assumes that the selection shown in FIG. 6B has been finalized. Thus, GUI 616 depicts pop up window 618 (which, like window 606, may be a pane overlaid on top of GUI 616 and not a separate window), that may allow a user to further specify a trigger for the workflow.

Window 618 contains a number of drop-down menus, some of which may be automatically populated based on the user's selection(s) from GUI 608. Particularly, trigger menu 620 may be populated to reflect the user's selection of the "Updated" option, and run trigger menu 630 may be populated to reflect that record-based triggers are expected to just run once. Nonetheless, the user may modify these selections in window 618.

Table menu 622 allows the user to specify a database table in which records can be found. As shown, this table is sys_user, which is assumed to contain one entry for each employee in the company. Table menu 622 may be capable of displaying a list of one or more available tables.

Condition menus 624, 626, and 628 allow the user to specify a condition of records in the selected table that will cause the workflow to be performed. This condition may be a state or a transition. For instance, condition menu 624 specifies "Active" to indicate that the records must be active, condition menu 626 specifies "changes from" to indicate records that change from active, and condition menu 628 specifies "true" to indicate any record that changes from active to another state.

In various embodiments, condition menu 624 may include entries for various fields in the sys_user table. These fields may include the phone number, building, city, department, address, manager, role, and so on. Condition menu 626 may include entries for "is", "is not", "is empty", "is not empty", "is anything", "is same as", "is different from" "changes", "changes from", "changes to", and/or various other logical operations. Condition menu 628 may include entries for items that are contextually based on the selections made for condition menus 624 and 626.

Viewed as a whole, the trigger specification of window 618 indicates that the workflow is to be performed once when any entry in the sys_user table is updated from active to another state (e.g., inactive). This would indicate that the user is no longer an active employee of the company.

Figure 6D:
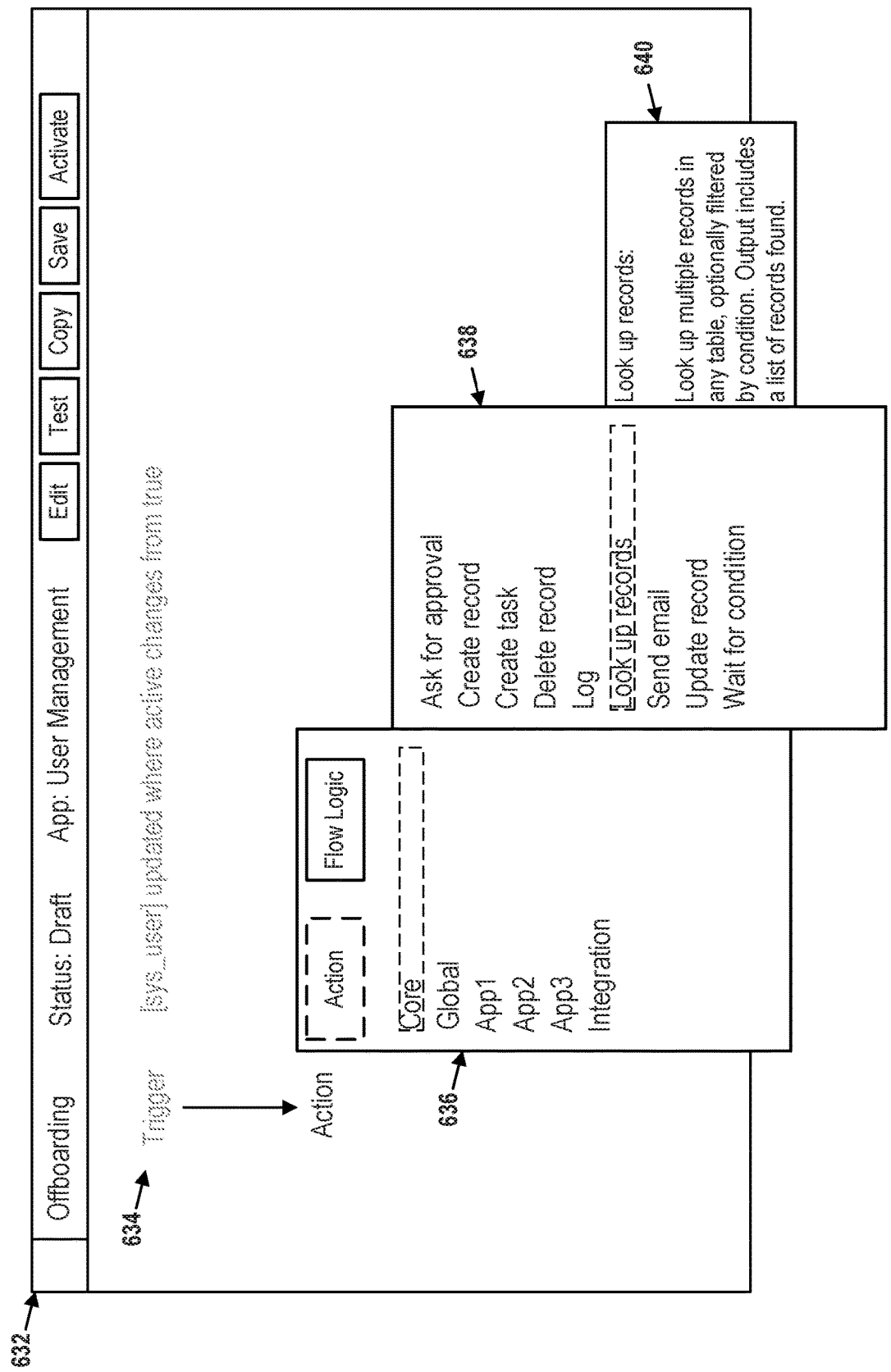

FIG. 6D depicts the first part of an action specification in GUI 632. Notably, at 634, the word "Trigger" is accompanied by a description of the trigger specified in FIGS. 6B and 6C. Further, this text is grayed in order to indicate that the trigger is no longer being specified.

As shown in menu 636, the user has the option of specifying an action or flow logic. The dashed line around the "Action" button indicates that an action is being specified. Particularly, menu 636 displays several contexts for the action being specified. For example, "Core" actions are supported by the computational instance as a default, while "Global" actions include all core actions, application-based, and integration-based actions. Application-based actions, "App1", "App2", and "App3", are actions supported by respective applications built on top of the remote network management platform. These may include, for example, various types of IT service management, IT operations management, customer service management, security operations, and CRM applications. Integration-based actions include actions defined by or supported by third-party applications integrated with the remote network management platform. These may include, for example, virtual chat applications, messaging applications, and so on. Each of these built-in or third-party applications may explicitly expose interfaces (referred to as "spokes") to the workflow design tool so that the workflow design tool can support workflows including data and/or functionality of these applications.

In FIG. 6D, the user has selected the "Core" context. Based on this selection, sub-menu 638 is displayed. This sub-menu provides the user the ability to select from a number of specific actions, such as "Ask for approval", "Create record", "Create task", "Delete record", "Log", "Look up records", "Send email", "Update record", and "Wait for condition". From these, the user has selected "Look up records". Accordingly, information box 640, that describes the selected action, may be displayed.

Figure 6E:
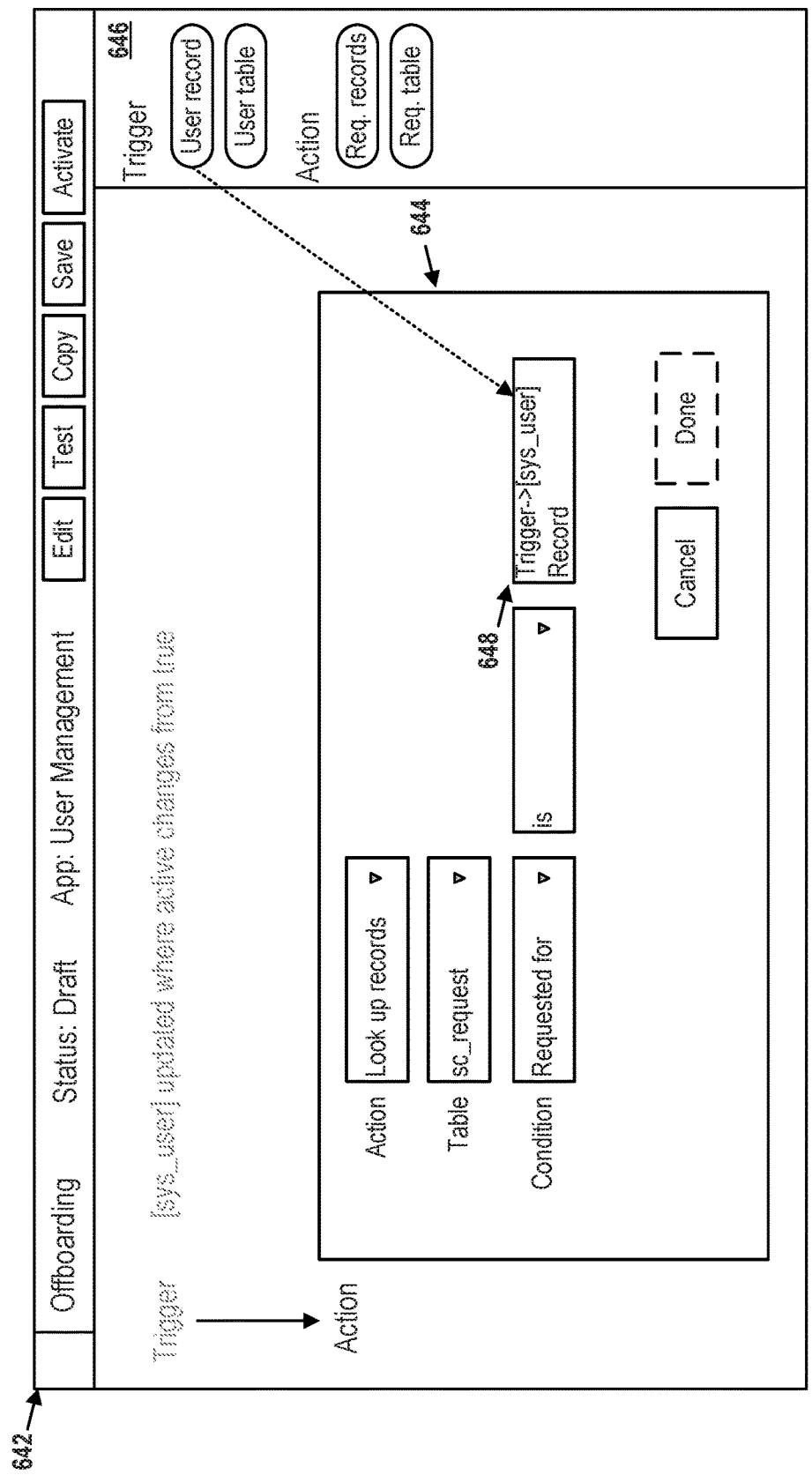

FIG. 6E depicts the second part of the action specification in GUI 642. Pop up window 644 (which, like window 606, may be a pane overlaid on top of GUI 642 and not a separate window), may allow specification of a table in which to look up records and the conditions that these records must meet. As shown in window 644, the action (as specified in FIG. 6D) is to look up records, and the table in which to perform this look up is sc_request (a table that contains catalog requests made by users). The records returned from sc_request are those where the "Requested for" field matches the user identified in the trigger step (i.e., a user whose active status has changed).

FIG. 6E also depicts column 646 containing pill-shaped user interface elements ("pills") arranged according to the previously-defined trigger as well as the action currently being defined. These pills are capable of being dragged from column 646 to the rightmost selectable item 648 in the condition field, as shown by the dotted arrow. User interface pills in this context are typically oval-shaped items that refer to data previously specified in the workflow and may be automatically placed in the user interface as this data is specified in the workflow design tool. In some embodiments, user interface chips or tags (with various shapes) may be used instead.

Notably, the two pills under the "Trigger" heading in column 646 refer to the user record(s) returned by the trigger (e.g., an entry in sys_user that changed from active to another state as specified in FIG. 6C) and the table upon which the trigger operates (e.g., sys_user as specified in FIG. 6C). The two pills under the "Action" heading in column 646 refer to the records found by the action being defined in FIG. 6E, as well as the table in which these records are located (e.g., sc_request).

The user interface elements, such as the pills in column 646, are a significant convenience for the user specifying the workflow, as they allow the user to easily include a reference to data or tables previously specified or referred to in the workflow. In this way, the user does not need to type in a specific reference to this information, and need only drag and drop a pill instead.

Once the user is satisfied with the information entered in window 644, the user may select or otherwise activate the "Done" button. This selection is denoted in FIG. 6E by this button being depicted with a dashed line. Once the user completes the dialog of window 644, the next phase of the workflow design tool, which allows the user to specify flow logic for the action, may be displayed.

Figure 6F:
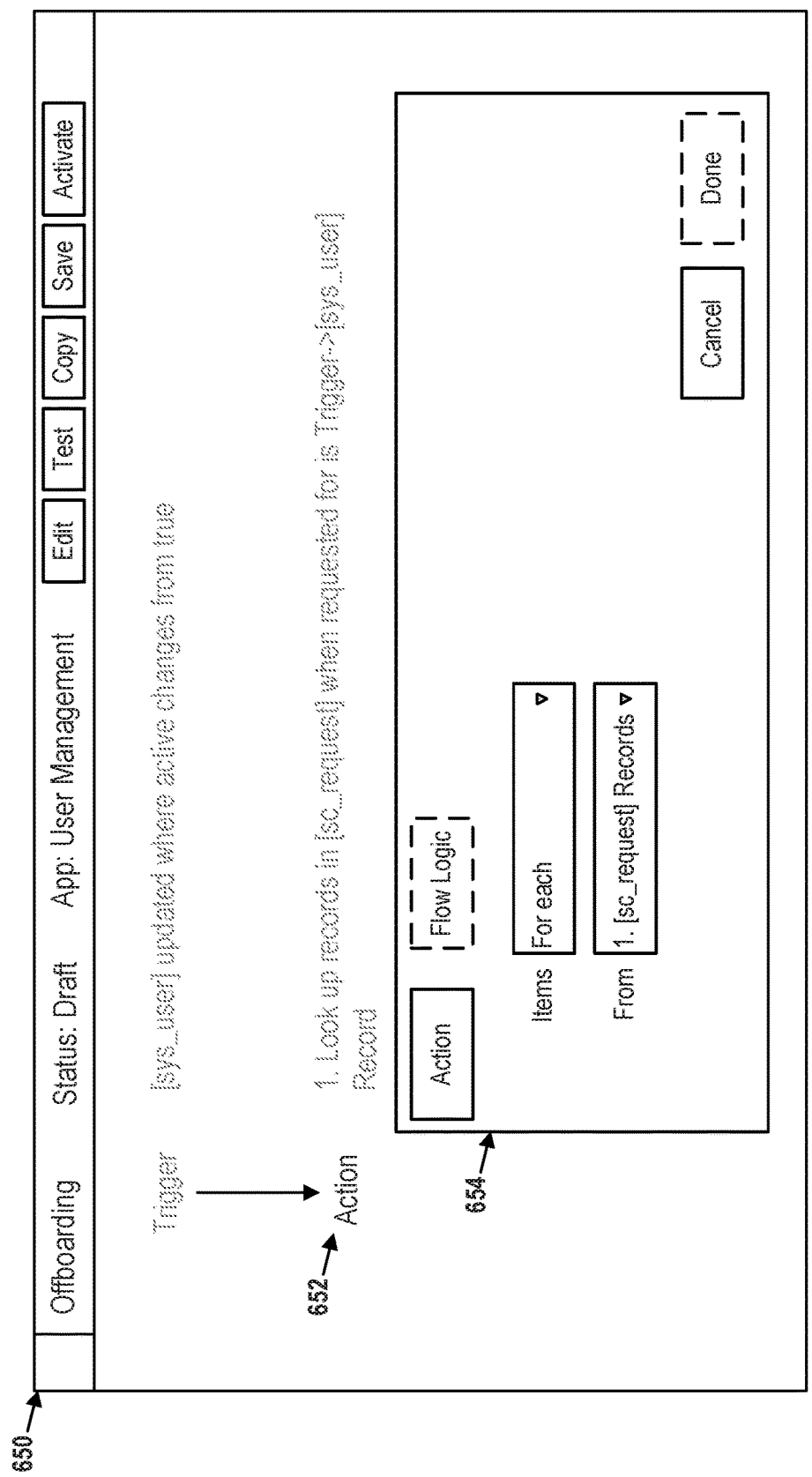

FIG. 6F depicts flow logic specification in GUI 650. Flow logic may be tied to an action, and specifies how the action is to be carried out. Notably, at 652 the word "Action" is annotated with a description of the action specified in FIGS. 6D and 6E.

Pop up window 654 may allow specification of whether the workflow operates on some or all items returned by the action specified in FIGS. 6D and 6E. The "Flow Logic" button is depicted with a dashed line to show that flow logic, rather than an action, is being specified. In this case, the selections made in window 654 indicate that the workflow operates on all items returned from the query specified in FIG. 6E. Notably, the "1. [sc_request] Records" value in the "From" field of window 654 indicates that the flow logic is to be applied to the output of Action 1, specified at 652. Notably, the value of the "From" field may be populated by a pill dragged and dropped from a column containing such pills. This column is not shown in FIG. 6F for purposes of simplicity, but may resemble column 646 of FIG. 6E.

Once the user is satisfied with the information entered in window 654, the user may select or otherwise activate the "Done" button. This selection is denoted in FIG. 6F by this button being depicted with a dashed line. Once the user completes the dialog of window 654, the next phase of the workflow design tool, which allows the user to specify a sub-action for the flow logic, may be displayed.

Figure 6G:
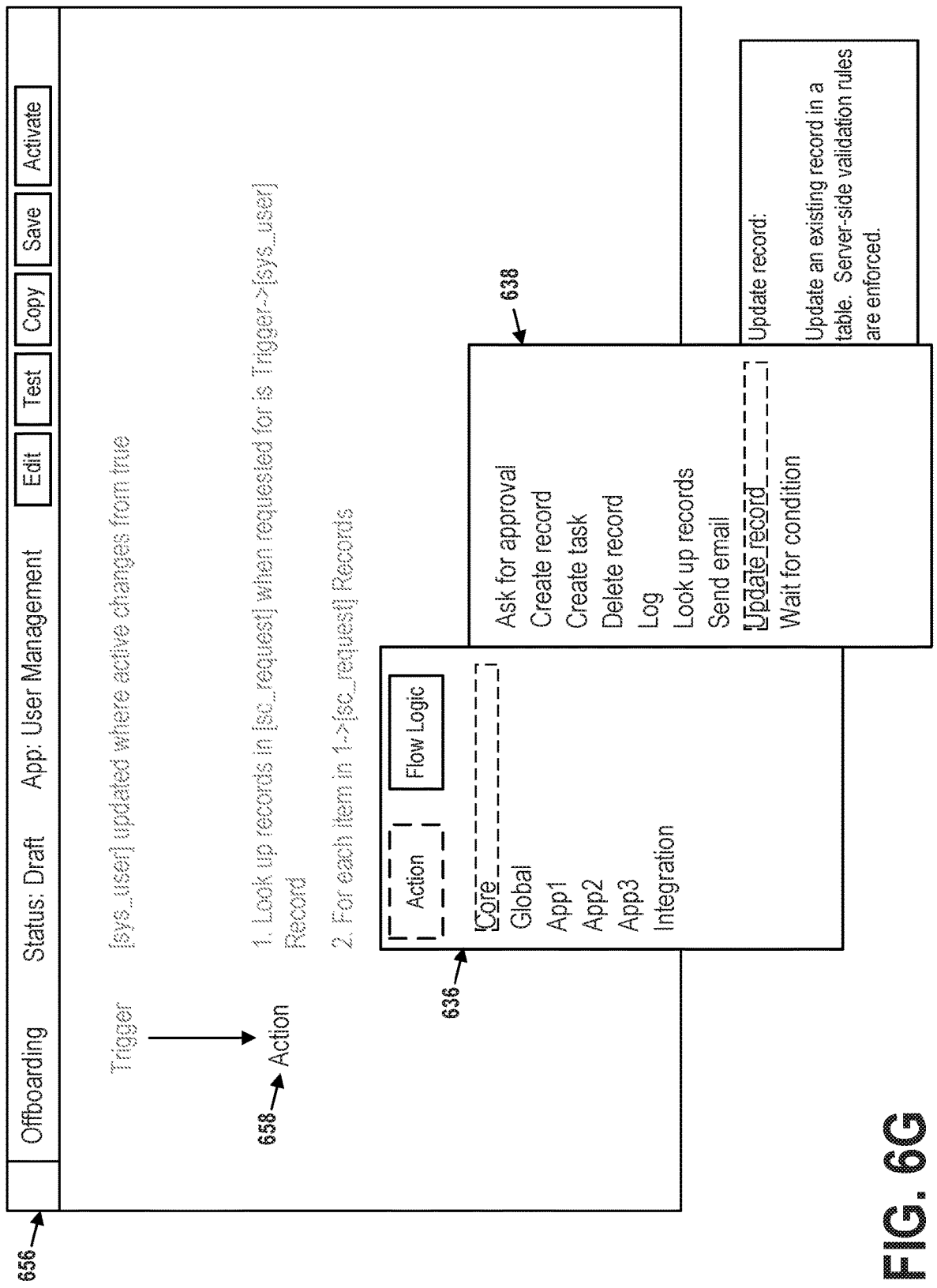

FIG. 6G depicts a sub-action specification in GUI 656. Notably, at 658, the word "Action" is accompanied by an updated description of the action and flow logic specified in FIGS. 6D, 6E, and 6F. Further, this text is grayed in order to indicate that the flow logic is no longer being specified. Notably, the sub-action specification once again displays menu 636 and sub-menu 638, this time with "Core" and "Update record" selected. Thus, GUI 656 depicts the user specifying that records will be updated for each item returned by the action defined in FIGS. 6D and 6E.

Figure 6H:
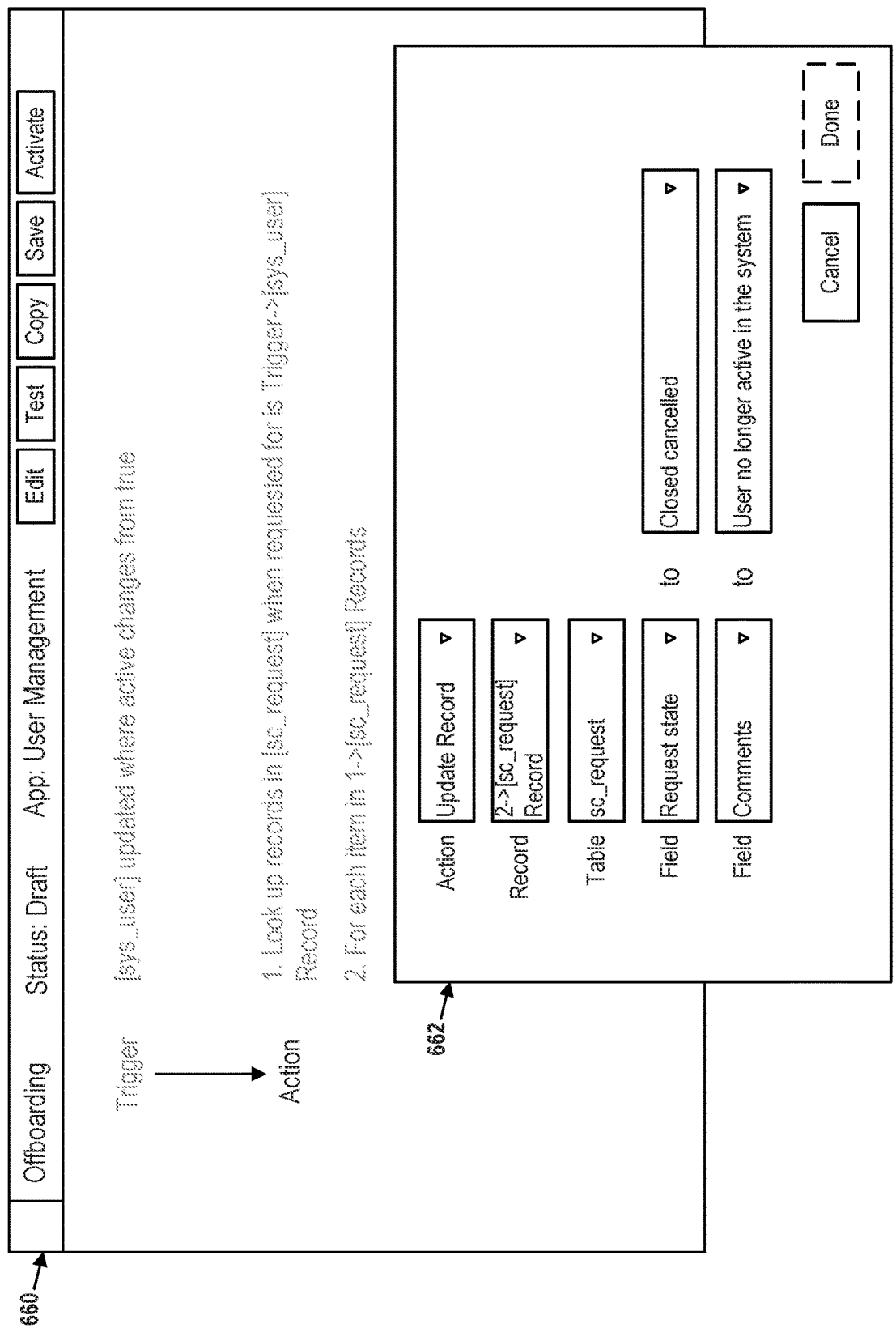

FIG. 6H continues this sub-action specification in GUI 660. Pop up window 662, may allow specification of actions to be taken on items returned by the flow logic specified in FIG. 6F. Particularly, the options shown in window 662 indicate that, for each record in the sys_user table that is returned by the trigger, any record in the sc_request table that was requested for the same user will be updated. The user also specifies two fields that are to be updated for matching records. The "Request state" field is to be updated to "Closed cancelled" to cancel the departed employee's pending catalog requests. The "Comments" field is also updated to "User no longer active in the system" to indicate why the request was cancelled.

Notably, the value of the "Record" field may be populated by a pill dragged and dropped from a column containing such pills. This column is not shown in FIG. 6H for purposes of simplicity, but may resemble column 646 of FIG. 6E.

Once the user is satisfied with the information entered in window 662, the user may select or otherwise activate the "Done" button. This selection is denoted in FIG. 6H by this button being depicted with a dashed line.

Figure 6I:
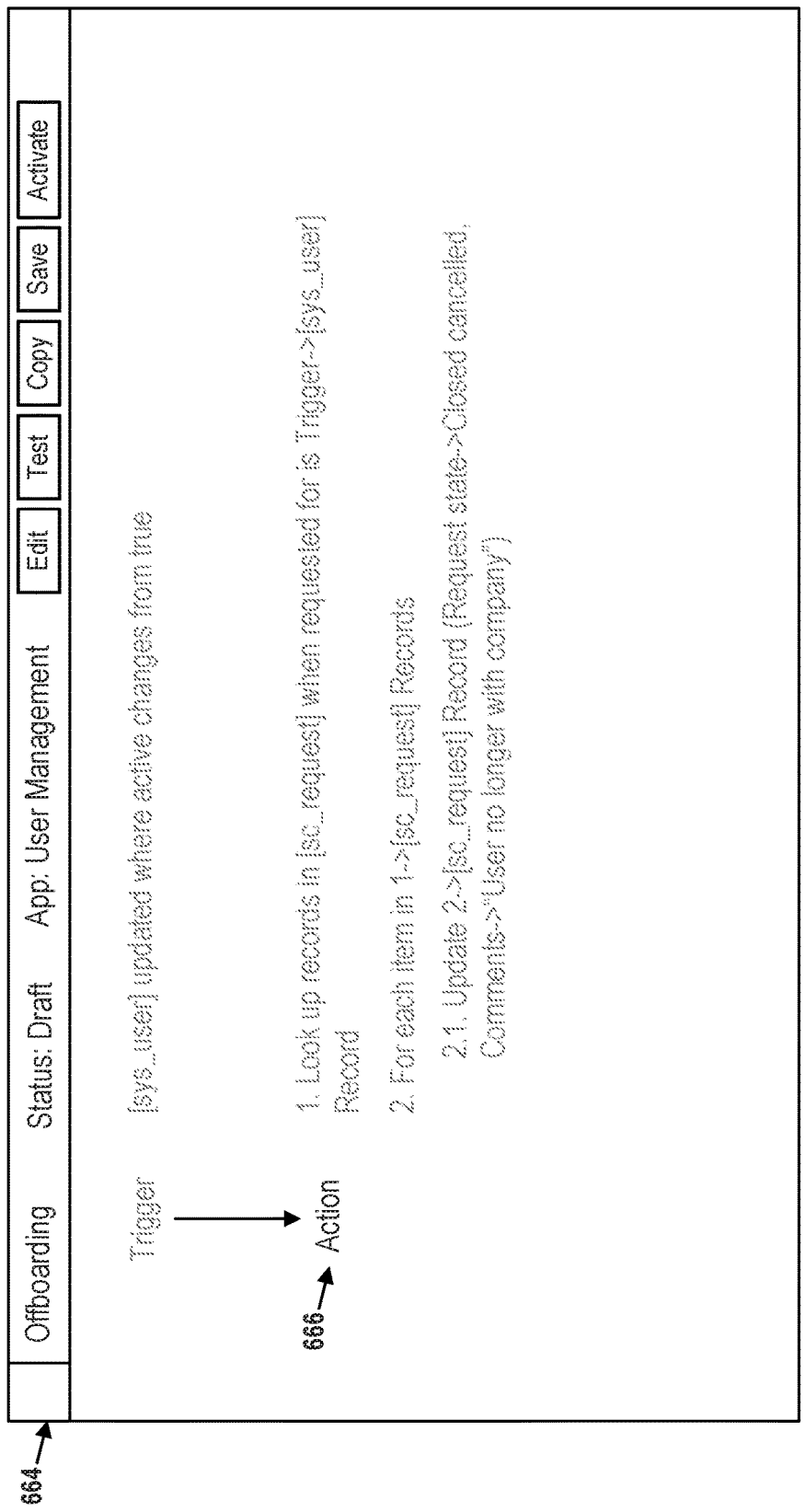

FIG. 6I shows GUI 664 depicting the workflow defined so far. At 666 the action specified in FIGS. 6D, 6E, 6F, 6G, and 6H is displayed. It is broken down into steps 1 (looking up records in the sc_request table that were requested for the employee identified by the trigger), 2 (for each these records, performing step/sub-action 2.1), and 2.1 (updating these records by closing them and adding an appropriate comment).

Figure 6J:
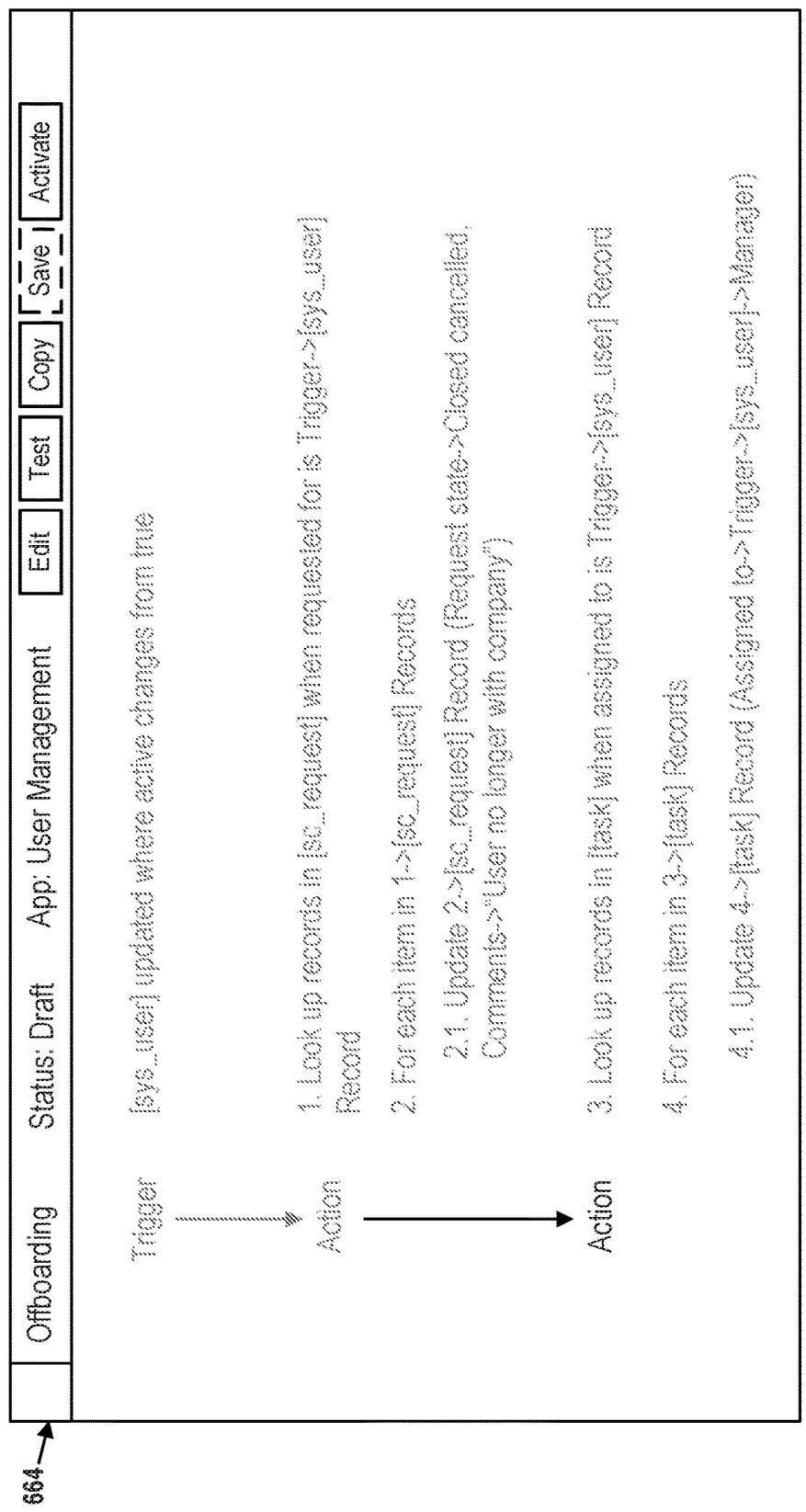

The rest of the desired workflow, as introduced above, also involves reassigning all tasks assigned to the departed employee to that person's manger. This further step is depicted in FIG. 6J. In order to avoid a degree of repetition, the GUIs for specifying the action, the flow logic, and the sub-action for task reassignment are omitted. Instead, FIG. 6J depicts GUI 664 updated to show the complete workflow.

Notably, step 3 looks up records in the task database table (which contains entries for tasks to be carried out by employees) that are assigned to the employee identified by the trigger. Step 4 specifies flow logic that, for each of these records, indicates that step/sub-action 4.1 is to be performed. Step 4.1 indicates that, for each record identified in step 4, the "Assigned to" field is to be changed to the manager of the identified employee.

In this way, arbitrarily complex flow-chart-like workflows can be rapidly designed in a data-centric fashion. The designer need not write any code, and is guided through the workflow specification by a series of GUIs that help the designer with appropriate menus and other interface elements. As a result, the designer saves a significant amount of time. In practice, experiments have shown that workflows can be specified in hours rather than the days typically needed for manually coding the workflows in a high-level programming language (e.g., JAVA®, JAVASCRIPT®, C++, and so on).

Another benefit of this workflow design tool is that it allows a workflow to be tested by the same GUI prior to deployment. FIG. 6K shows GUI 668, which contains the same information as GUI 660 from FIG. 6J, but also includes three columns reflecting the outcome of such a test. The "State" column indicates whether each step has been completed (in this example, all steps were completed), the "Start time" column indicates the time at which each step began, and the "Duration" column indicates how long each step took to be performed, in milliseconds. This allows the designer to verify that each step is properly performed, as well as to identify any steps that take an inordinate amount of time to complete. In alternative embodiments, other information may be displayed.

VI. Example Cloud Based Services

As previously noted, a "service" may refer to a high-level capability provided by one or more applications executing on one or more devices working in conjunction with one another. Building on this, "cloud services" may refer to remote services that are made available and managed by a cloud provider. Cloud services may include online data storage services, document collaboration services, virtual machine services, web hosting services and more. Each cloud service may provide access to computing resources (e.g., databases, virtual machines, software applications, etc.) available to users statically or on demand. Because the cloud provider supplies the hardware and software necessary for the cloud service, a managed network may not have to devote time to provision or deploy its own infrastructure to manage the cloud service.

Cloud services were discussed above in the context of third-party networks 340. Thus, examples of cloud providers (which herein can be referred to as "remote networks") may include AMAZON WEB SERVICES®, MICROSOFT® AZURE®, and IBM CLOUD®. Examples of cloud services made available by cloud providers may include AMAZON AURORA® (a relational database management service) and AZURE® Blob Storage (an unstructured data storage service). Other cloud providers and cloud services may exist.

To keep up with increased demand for additional operations, cloud providers may regularly update their cloud services offerings. That is, a cloud provider may develop new cloud services, adjust older cloud services, and/or remove outdated cloud services. Such updates may occur every week, every few months, or every year. Additionally, new cloud providers may be established, each offering different sets of new cloud services.

It may be advantageous for managed network 300 to be able to utilize the functionality provided by new cloud services and/or new cloud providers. Moreover, an entity operating remote network management platform 320 may find it desirable to administer, discover, and interact with these new cloud services and/or new cloud providers on behalf of managed network 300.

Yet, configuring remote network management platform 320 to utilize a new cloud service and/or new cloud provider may be challenging. In some cases, this may involve a team of application developers creating custom software to incorporate a new cloud service into remote network management platform 320. This may take weeks or even months, as the development process may involve rigorous integration testing.

To address this or other issues, the entity operating remote network management platform 320 may provide a customizable cloud discovery workflow to quickly integrate with new cloud services and/or new cloud providers. Advantageously, such a cloud discovery workflow may be configurable via a specification provided by remote network management platform 320 or managed network 300, removing the need for custom software to be developed. Once configured, the cloud discovery workflow may discover and interact with new cloud services and/or cloud providers. Discovered information may then be used to populate CMDB 500 on remote network management platform 320.

By using the embodiments herein to discover cloud services, the cloud discovery workflow may be considered "provider-neutral." That is, the cloud discovery workflow may include no specific details on cloud services and/or cloud providers, but may obtain these details from the user when the cloud discovery workflow is defined. Because of this characteristic, the customizable cloud discovery workflow may also be referred to as a "provider-neutral cloud discovery software application." Advantageously, such an application may be presented to the user as a single cloud-discovery application rather than several disjoint applications for each cloud provider, allowing the user to easily configure multiple cloud services and/or cloud providers all under one graphical interface.

Figure 7A:
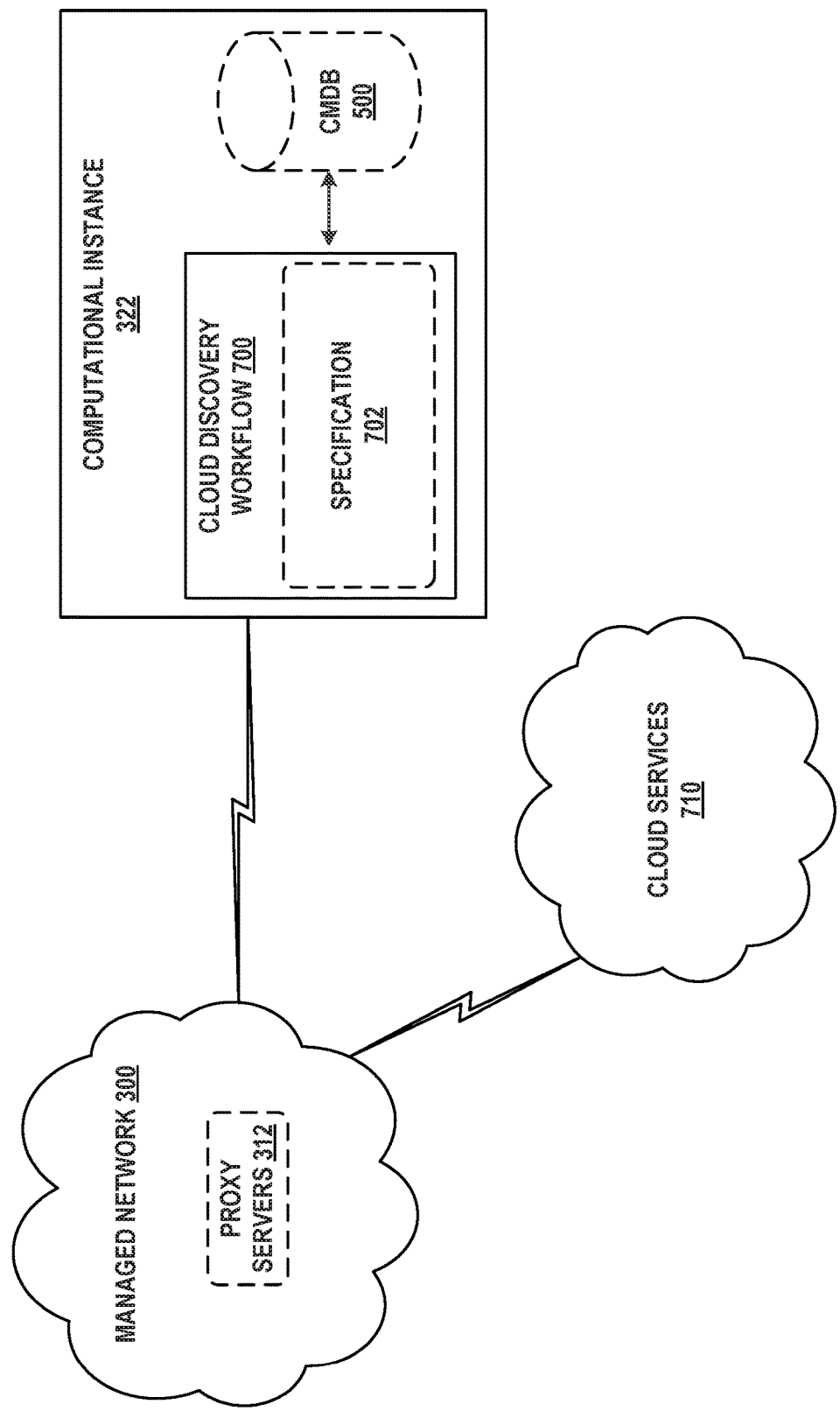
FIG. 7A depicts a cloud discovery architecture to facilitate a cloud discovery workflow, in accordance with example embodiments.

FIG. 7A depicts a cloud discovery architecture to facilitate a cloud discovery workflow, in accordance with example embodiments. This architecture includes three main components, managed network 300, computational instance 322, and cloud services 710, all communicatively connected, for example, by way of a network. As noted above, cloud services 710 may take on some or all of the properties discussed for third-party networks 340.

Computational instance 322 may be disposed within remote network management platform 320 and dedicated to managed network 300. Computational instance 322 may store discovered configuration items that represent the environment of managed network 300 in CMDB 500. Additionally, computational instance 322 may include cloud discovery workflow 700 to facilitate discovering cloud services 710 offered by cloud providers. Once discovered, computational instance 322 may provide reports related to the architecture, usage, performance, and billing of cloud services 710.

Managed network 300 may be an enterprise network used by an entity for computing and communications tasks, as well as storage of data. In examples, managed network 300 may be a subscriber to one or more of cloud services 710. These may include computational, data storage, communication, and/or hosting services. For instance, if managed network 300 provides online music streaming services, a cloud service that stores music files may be used. Managed network 300 may include one or more proxy servers 312. Possibly with the assistance of proxy servers 312, computational instance 322 may be able to discover and manage aspects of cloud services 710 that are used by managed network 300.

To make use of cloud services 710, managed network 300 may first establish an account with each cloud provider for which one or more of cloud services 710 are requested. After establishing the accounts, managed network 300 may specify a subset of cloud services 710 which it would like to discover. For instance, managed network 300 may be interested in discovering only database services and virtual machine services associated with these accounts. Once accounts are established, managed network 300 may configure cloud discovery workflow 700 with specification 702 to discover features of cloud services 710 available to or used by managed network 300.

Specification 702 may be a file, database table(s), or set of associations that includes account information details (e.g., passwords, usernames) and access details for cloud services 710. For instance, given that each cloud services 710 may be accessed through one or more application programming interfaces (APIs), specification 702 may contain a list of API endpoints for cloud services 710. Additionally, specification 702 may include one or more mappings between discovered computing resources offered by cloud services 710 and configuration items in CMDB 500. These mappings may be used by managed network 300 so that discovered computing resources are correctly stored in specific fields and tables on CMDB 500.

Once provided with specification 702, cloud discovery workflow 700 may begin to discover cloud services 710. Advantageously, if managed network 300 were to integrate a new service provided by cloud services 710, no additional software updates to computational instance 322 may be necessary. Rather, managed network 300 may simply update specification 702 (e.g., by way of a GUI) and cloud discovery workflow 700 may be updated accordingly.

Figure 7B:
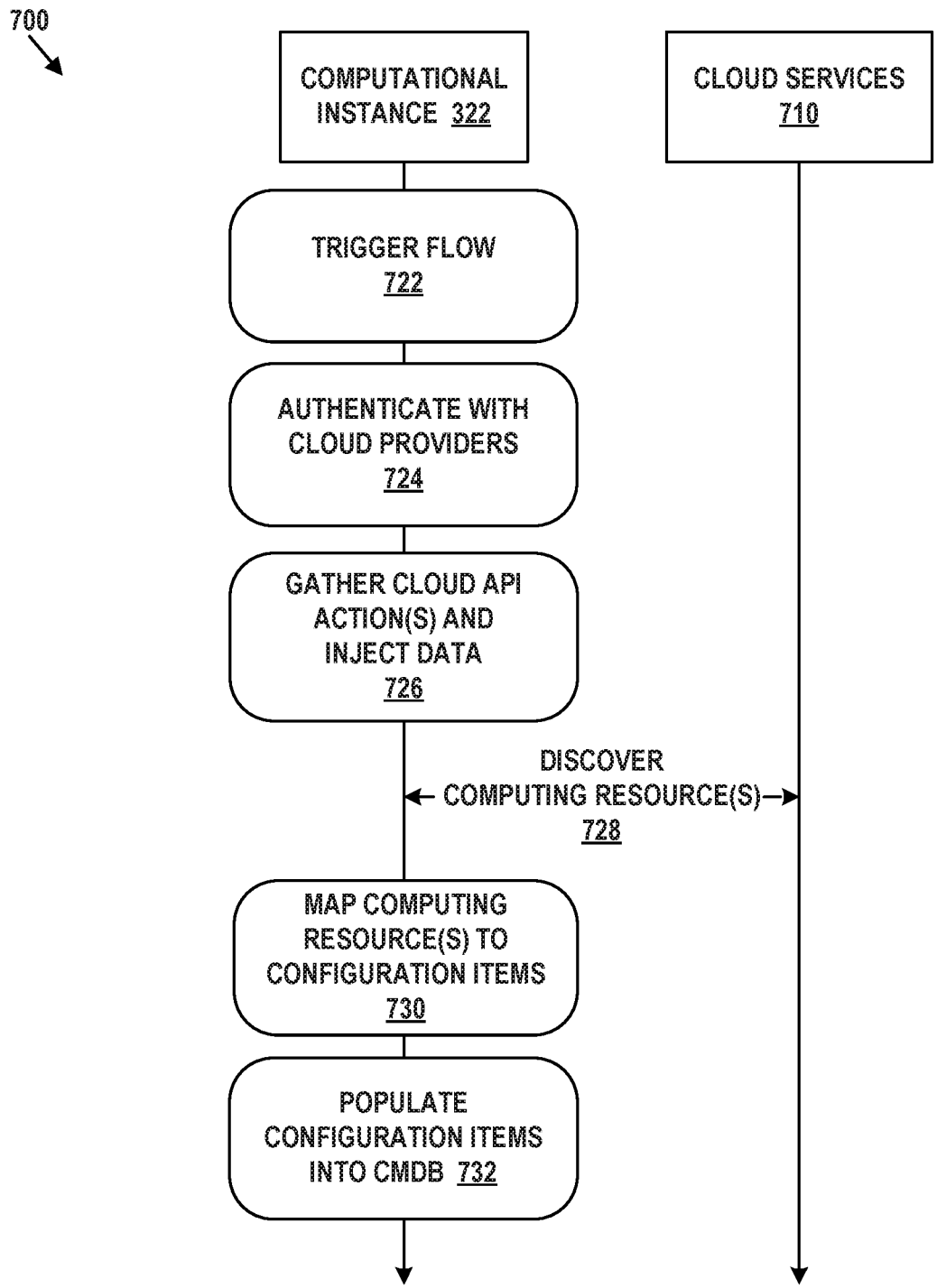
FIG. 7B depicts a message flow diagram of a cloud discovery workflow, in accordance with example embodiments.

FIG. 7B depicts a message flow diagram of cloud discovery workflow 700, in accordance with example embodiments. Workflows and their configuration by way of a GUI were previously discussed in connection with FIGS. 6A-6K. In particular, the workflow of FIG. 7B may represent a specific sequence or series of actions that, when performed, allow computational instance 322 to discover one or more cloud services 710. By way of example, cloud discovery workflow 700 may utilize computational instance 322 and cloud services 710 during operations. However, additional components, steps, or blocks, may be added to cloud discovery workflow 700.

At step 722, cloud discovery workflow 700 may be invoked through one or more triggers. Triggers were previously discussed in connection with FIGS. 6A-6K. In cloud discovery workflow 700, triggers may originate from commands transmitted by managed network 300 to computational instance 322 and/or from conditions on computational instance 322. In one example, a trigger may be a change to an entry in specification 702. As another example, a trigger may be a request from managed network 300 to start cloud discovery workflow 700. In yet another example, triggers may be automatically scheduled (e.g., once per a week). Other triggers and trigger conditions may exist.

At step 724, cloud discovery workflow 700 may gather data from specification 702 to authenticate with one or more cloud providers. For example, specification 702 may include references to authentication scripts that enable authentication with cloud providers for which one or more of cloud services 710 are requested. By executing these scripts, cloud discovery workflow 700 may begin to interact with cloud services 710 provided by one or more authenticated cloud providers.

At step 726, cloud discovery workflow 700 may gather data from specification 702 to configure one of more cloud API actions. Actions were previously discussed in connection with FIGS. 6A-6K. In cloud discovery workflow 700, a cloud API action may be designed to discover cloud services 710 offered by a cloud provider. For instance, one cloud API action may discover cloud services 710 provided by AMAZON WEB SERVICES® while a different cloud API action may discover cloud services 710 provided by MICROSOFT® AZURE®. Each cloud API action may be associated with an API script that performs the functions of the cloud API action. Data from specification 702 may be used to: (i) identify API scripts and (ii) populate information within these API scripts.

As an example, specification 702 may reference an API script for discovering services provided by MICROSOFT® AZURE®. Initially, the API script may contain general, service-agnostic information (e.g., DNS records, hostnames, and/or SSL certificates) for MICROSOFT® AZURE®, but may lack details on cloud services 710 actively used by managed network 300. During operations, cloud discovery workflow 700 may use information from specification 702 to populate the API script with details on cloud services 710, for example, by providing API endpoints of cloud services 710. Once populated, the API script may contain the necessary information to discover cloud services 710. The ability to "populate" information into API scripts enables cloud discovery workflow 700 to easily add (or remove) cloud services 700 without having to modify the API scripts. Namely, API scripts may include no details of cloud services 710, but may obtain these details when cloud discovery workflow 700 is invoked.

At step 728, cloud discovery workflow 700 may discover computing resources on cloud services 710. This may involve computational instance 322 executing cloud API actions to query the API endpoints of one or more cloud services 710. API endpoints may be queried by way of a representational state transfer (REST), remote procedure call (RPC), or simple object access protocol (SOAP) requests. The response received from cloud services 710 may include descriptions of computing resources available to or used by managed network 300. In example embodiments, the descriptions may be in XML, JavaScript Object Notation (JSON), or YAML Ain't Markup Language (YAML) format.

In some embodiments, the discovery of computing resources on cloud services 710 may be facilitated via proxy servers 312 disposed on managed network 300. That is, computational instance 322 may transmit query commands to proxy servers 312. In response, proxy servers 312 may transmit probes (e.g., REST queries) to API endpoints of clouds services 710. Cloud services 710 may transmit responses to proxy servers 312, and proxy servers 312 may then provide information regarding discovered computing resources to computational instance 322 for storage on CMDB 500.

At step 730, cloud discovery workflow 700 may apply a mapping to translate the discovered computing resources into a format ingestible by CMDB 500 (i.e., the format of a configuration item). The mapping may be directed, for example, via a mapping provided by specification 704.

At step 732, the mapped computing resources may be stored into CMDB 500 on computational instance 322. At this point, CMDB 500 may contain information relating operating system versions, hardware configurations, applications, network configurations, and/or other details for cloud services 710 utilized by managed network 300. As similarly described above, this collected information may be presented to a user in various ways to allow the user to view the hardware composition and operational status of cloud services 710, as well as the characteristics of cloud services 710 that span multiple regions.

VII. Example Configuration Interfaces

To enable cloud discovery workflow 700, remote network management platform 320 may prompt a user from managed network 300 to enter the appropriate data for specification 702. This may be accomplished by way of a web page or series of web pages hosted by computational instance 322 and provided to the user from managed network 300 upon request. Notably, the following examples of web pages are merely for purposes of illustration and not intended to be limiting. Other web pages including alternative arrangements of information may exist.

Figure 8:
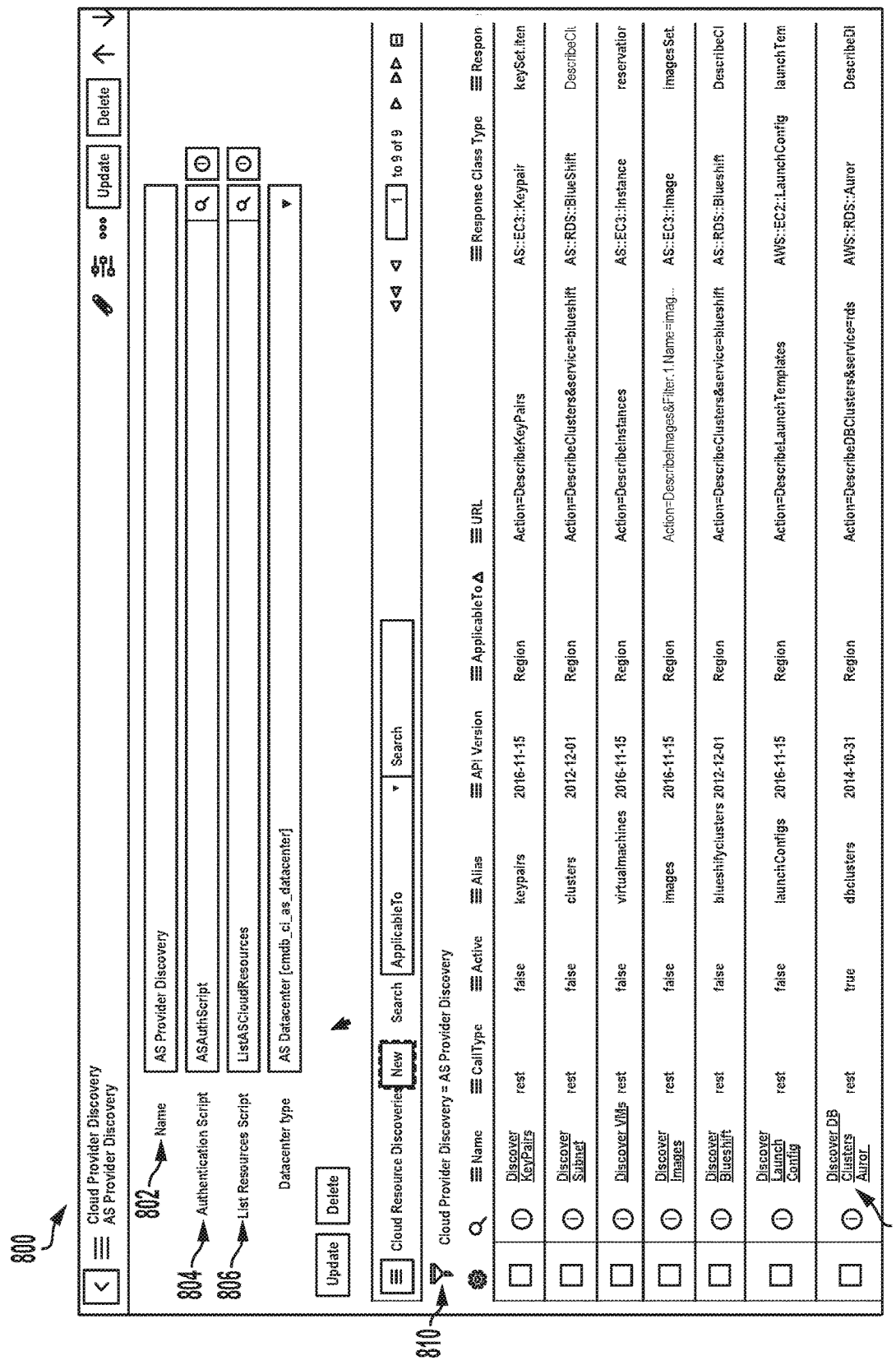
FIG. 8 illustrates a cloud provider web page, in accordance with example embodiments.

FIG. 8 illustrates web page 800, in accordance with example embodiments. Web page 800 facilitates the identification, configuration, and management of a particular cloud provider by allowing a user to specify configuration details related to the particular cloud provider. Details from cloud providers configured by web page 800 may be included in specification 702.

Name field 802 may allow users to assign a unique name to the particular cloud provider. This unique name may then be used to differentiate the particular cloud provider from other configured cloud providers.

Authentication script 804 may include a reference to an executable routine stored on computational instance 322 that provides authentication information to the particular cloud provider. Authentication information may include account details, such as access keys, usernames, and/or other credentials. During cloud discovery workflow 700, authentication script 804 may retrieve authentication information, package the authentication information into an API request, and transmit the API request to an appropriate API endpoint in order to authenticate with the particular cloud provider.

API script 806 may include a reference to an executable routine stored on computational instance 322 that discovers one or more cloud services 710 offered by the particular cloud provider. During cloud discovery workflow 700, API script 806 may be populated with information from cloud services list 810 (e.g., API endpoints, call types) to create a cloud API action.

Cloud services list 810 may include a list of cloud services that managed network 300 has configured for the particular cloud provider. As illustrated in FIG. 8, cloud services list 810 may contain configuration details for virtual machine services, subnet services, and database cluster services. Configuration details for each cloud service on cloud service list 810 may be edited as well as new cloud services added. For example, if the user clicks on or otherwise activates cluster service 812, the user may be directed to a cloud service configuration page that enables the user to edit the configuration details for cluster service 812.

Figure 9:
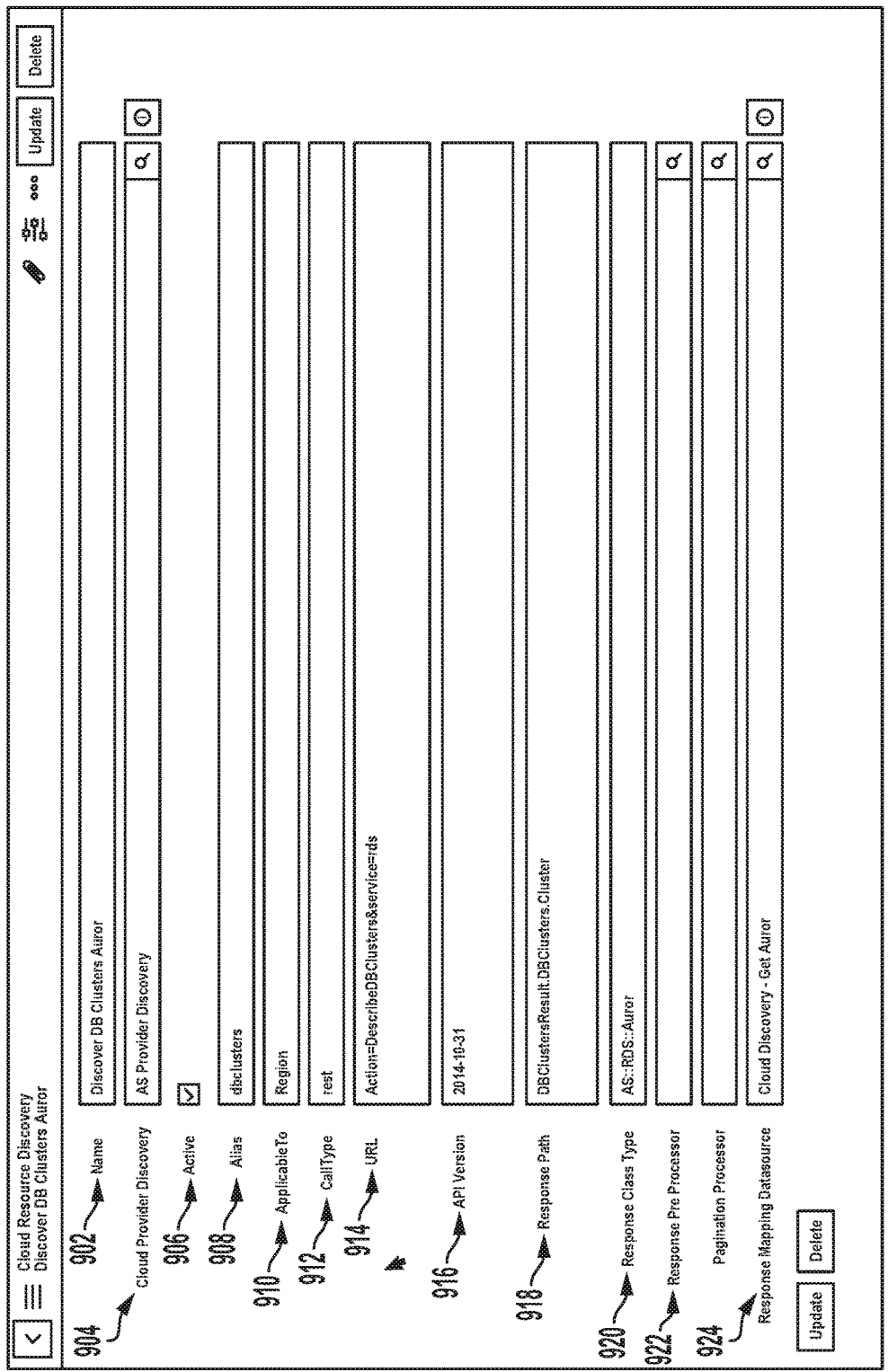
FIG. 9 illustrates a cloud service configuration web page, in accordance with example embodiments.

FIG. 9 illustrates a cloud service configuration web page 900, in accordance with example embodiments. Web page 900 facilitates the identification, configuration, and management of a particular cloud service by allowing a user to specify configuration details related to the particular cloud service. In example embodiments, web page 900 may be provided to the user from managed network 300 upon clicking on or otherwise activating a cloud service from cloud services list 810, for example, cluster service 812. As used herein, configuring a cloud service using web page 900 may be referred to as defining a cloud service. Details from cloud services defined by web page 900 may be included in cloud services list 810 and/or in specification 702.

In some embodiments, elements of web page 900 may be strict or non-strict. Strict elements may refer to elements of web page 900 that may be included to properly access a cloud service. As an example, URL field 914, call type 912, and response path 918 may be labeled as strict elements. Non-strict elements may refer to elements of web page 900 that may be optionally included when configuring a cloud service. For example, API version 916, response preprocessor 922 and alias 908 may be non-strict elements.

Name field 902 may allow users to assign a unique name to the cloud service defined via web page 900. This unique name may be used to differentiate the particular cloud service from other cloud services of cloud providers.

Cloud provider discovery field 904 may be a text field that associates the cloud service defined by web page 900 to a particular cloud provider. For example, cloud provider discovery field 904 may contain the same name as the name field 802 from web page 800.

Active flag 906 may be a checkbox indicating whether the cloud service defined via web page 900 is active. Being active (e.g., active flag 906 is checked) may indicate that a cloud service is actively being utilized by the user from managed network 300. That is, managed network 300 may be paying for, subscribing to, and/or employing operations that interact with the cloud service. On the other hand, being non-active (e.g., active flag 906 is unchecked) may indicate that a cloud service has been configured, but is not actively being utilized by the user. During cloud discovery workflow 700, API script 806 may be populated with information from active cloud services of cloud service list 810 and not populated with information from non-active cloud services of cloud services list 810.

Alias 908 may provide the ability to assign an abridged or alternative name to the cloud service defined via web page 900. This name may be used in addition to/alternatively to the name provided in name field 902.

Applicable to field 910 may include information specifying the "scope" of the cloud service defined via web page 900. In the context of this current disclosure, scope may refer to specific locations (either physical or non-physical) where a cloud service may operate in. Different scopes may result in different configurations for cloud service workflow 700. For example, a cloud database service that has clusters spread across separate geographic regions may have a REGION scope. This scope may require cloud service workflow 700 to make separate API requests to each geographic region to discover computing resources. As another example, a cloud SSH service that stores SSH keys may have an ACCOUNT scope. This scope may allow cloud service workflow 700 to make a single API request to discover computing resources. Information on how to interact with each scope may be provided to cloud service workflow 700 via specification 702. Moreover, scopes other than those described above may be used.

Call type 912 may include information indicating a specific web protocol that cloud discovery workflow 700 should use when discovering the cloud service defined via web page 900. As noted, example web protocols may include REST, RPC, or SOAP. In some cases, call type 912 may specify a call to a software development kit (SDK) of a cloud provider (which in turn may call a cloud service API).

URL field 914 may allow users to specify the API endpoint of the cloud service defined via web page 900. Additionally, URL field 914 may allow users to add URL parameters (e.g., embedded JSON payloads) that can be transmitted when discovering a cloud service.

API version 916 may allow users to specify the API release version for the cloud service defined via web page 900. Different API release versions may be compatible with certain entries for URL field 914, call types 912, and/or response path 918. For example, API version 1.1 may use a SOAP call type and return information in JSON, while API version 1.2 may use a REST call type and return information in XML. By specifying API version 916, cloud discovery workflow 700 can notify cloud services 710 of the API release version that the cloud service should use to be compatible with the entries from web page 900.

In some cases, descriptions of computing resources received from discovered cloud services 710 may contain extraneous information that managed network 300 does not want to store in CMDB 500. To acquire only relevant data, response path 918 may be used. Response path 918 may include a concatenation of the nested objects and/or arrays that may locate a specific element within the received descriptions. Using such paths can be advantageous when parsing the descriptions, because not all elements may be of interest and paths can be used to define the elements that are of interest. For example, upon discovery, a cloud database service may return a description of database computing resources in the following XML format:

```
<DBClusterResult>
    <DBClusters>
        <Cluster> </Cluster>
    </DBClusters>
</DBClusterResult>
```

If database clusters are relevant to CMDB 500, response path 918 may include a structured path to "Cluster". This path may appear as the following: DBClusterResult.DBClusters.Cluster. During operations, cloud discovery workflow 700 may utilize response path 918 to extract values from descriptions and write them to a file and/or a database table on CMDB 500.

Response class type 820 may include information that associates a resource class with discovered cloud services 710. In example embodiments, users may enter details into response class type 820 based on documentation provided by a cloud provider. Associating a resource class may allow a user to identify particular fields that may exist in the descriptions of discovered computing resources received from cloud services 710. This may benefit the user when configuring mappings to CMDB 500, as further described below.

Response preprocessor 922 may include a reference to an executable pre-processing script. Such a script may be configured to filter input data, modify input data, and/or perform other operations on input data. Upon receiving descriptions of computing resources discovered from cloud services 710, cloud discovery workflow 700 may be configured to execute pre-processing script to transform these descriptions into an alternative format.

Response mapping field 924 may contain a reference to a mapping between cloud services 710 and configuration items in CMDB 500. During operations, cloud discovery workflow 700 may apply the mapping specified in response mapping field 924 to descriptions of computing resources received from cloud services 710. The mapping may transform these descriptions into a format ingestible by CMDB 500. For example, given that CMDB 500 stores configuration items associated with databases in a table titled "cmdb_DB", an appropriate mapping may connect each element of a received database description to a field in "cmdb_DB" table. Each mapping may be configured via a web page or series of web pages hosted by a computational instance associated with managed network 300 and provided to a user upon request.

Figure 10:
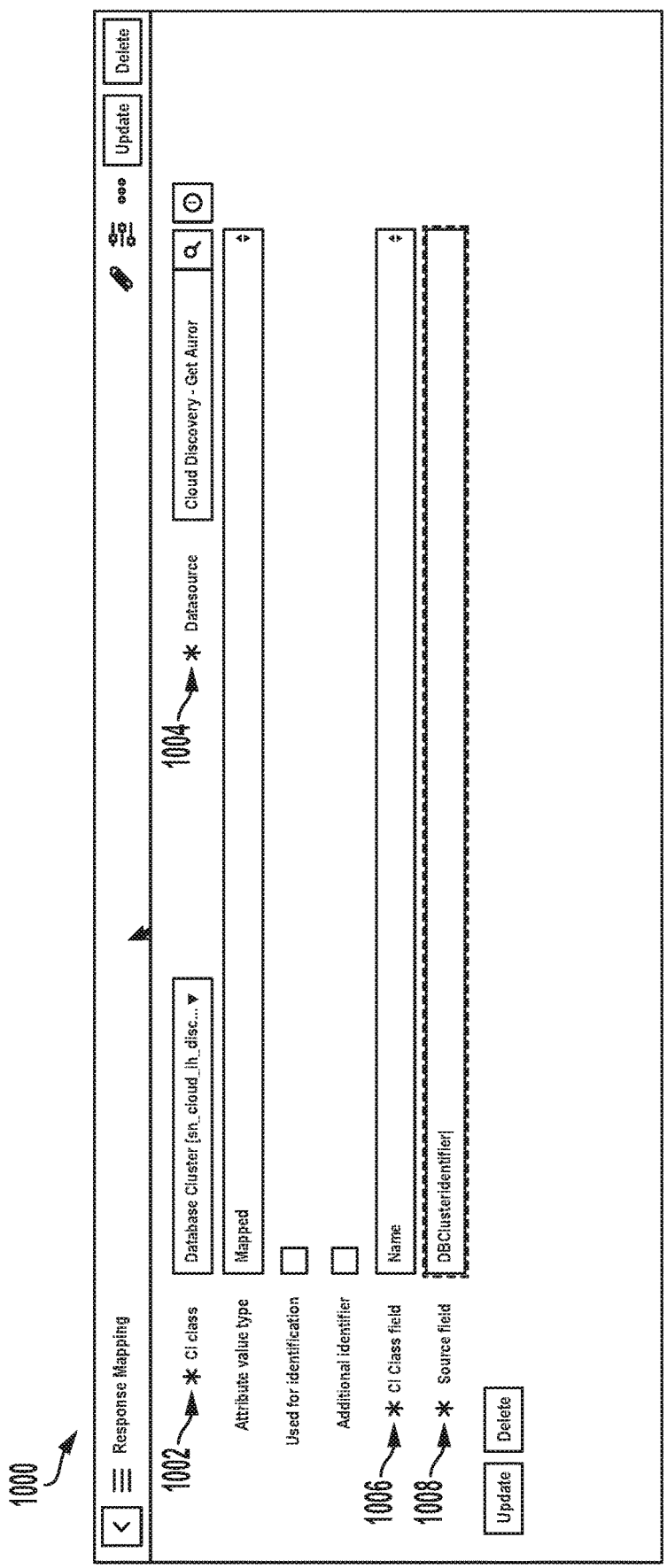
FIG. 10 illustrates a mapping configuration web page, in accordance with example embodiments.

FIG. 10 illustrates a mapping configuration web page 1000, in accordance with example embodiments. Web page 1000 facilitates the configuration and management of mappings between descriptions of computing resources received from cloud services 710 and entries in CMDB 500 by allowing a user to specify configuration details related to a particular mapping. Notably, configuring a mapping using web page 1000 may be referred to as defining a cloud mapping. Details from mappings defined by web page 1000 may be included in specification 702.

To properly configure a mapping, configuration item (CI) class 1002, data source 1004, CI class field 1006, and source field 1008 may be used. CI class 1002 may be an input field indicating a particular CI table in CMDB 500. CI class field 1006 may represent a field in the particular CI table. Data source 1004 may be an input field indicating a particular cloud service. For example, data source 1004 may contain the same entry as response mapping field 924 from web page 900. Source field 1004 may represent a specific field in the description received from the particular cloud service. Accordingly, mappings configured via web page 1000 may load information received in source field 1008 of data source 1004 into CI class field 1006 of CI class 1002.

In example embodiments, web page 1000 may be utilized to configure mappings for multiple fields. For example, if a user wants to map information for five different source fields 1008 of data source 1004, the user may use web page 1000 to configure five mappings. In scenarios where the descriptions of computing resources received from cloud services 710 contain fields that are unmapped (i.e., no mappings configured by web page 1000), these fields may be ignored by cloud discovery workflow 700 and not propagated into CMDB 500.

VIII. Example Operations

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 involves obtaining, by a provider-neutral cloud discovery software application, a specification related to a remote network. The provider-neutral cloud discovery software application is executable on one or more processors disposed within a computational instance of a remote network management platform. The computational instance is dedicated to a managed network. Additionally, persistent storage disposed within the computational instance contains representations of discovered configuration items related to the managed network in database tables. Further, the specification defines an interface for accessing the remote network, a discoverable set of computing resources of a computing service provided by the remote network, and mappings between (i) descriptions of the discoverable set of computing resources, and (ii) fields of the database tables.

Block 1102 involves logging on to, by the provider-neutral cloud discovery software application, the remote network by way of the interface.

Block 1104 involves requesting and receiving, by the provider-neutral cloud discovery software application and from the remote network, the descriptions of the discoverable set of computing resources.

Block 1106 involves storing, by the provider-neutral cloud discovery software application and in the fields of the database tables, the descriptions of the discoverable set of computing resources in accordance with the mappings.

Some embodiments involve obtaining, by the provider-neutral cloud discovery software application, a second specification related to the remote network, where the second specification defines the interface for accessing the remote network, a second discoverable set of computing resources of a second computing service provided by the remote network, and second mappings between (i) descriptions of the second discoverable set of computing resources, and (ii) the fields of the database tables. The embodiments may also involve logging on to, by the provider-neutral cloud discovery software application, the remote network by way of the interface, requesting and receiving, by the provider-neutral cloud discovery software application and from the remote network, the descriptions of the second discoverable set of computing resources, and storing, by the provider-neutral cloud discovery software application and in the fields of the database tables, the descriptions of the second discoverable set of computing resources in accordance with the second mappings.

Some embodiments involve obtaining, by the provider-neutral cloud discovery software application, a second specification related to a second remote network, where the second specification defines a second interface for accessing the second remote network, a second discoverable set of computing resources of a second computing service provided by the second remote network, and second mappings between (i) descriptions of the second discoverable set of computing resources, and (ii) the fields of the database tables. The embodiments may also involve logging on to, by the provider-neutral cloud discovery software application, the second remote network by way of the second interface, requesting and receiving, by the provider-neutral cloud discovery software application and from the remote network, the descriptions of the second discoverable set of computing resources, and storing, by the provider-neutral cloud discovery software application and in the fields of the database tables, the descriptions of the second discoverable set of computing resources in accordance with the second mappings.

In some embodiments, the remote network is a cloud-based network that is physically distinct from the remote network management platform and the managed network, and the remote network management platform and the managed network access the remote network by way of a wide-area network.

In some embodiments, the specification also defines an authentication mechanism for the remote network, and logging on to the remote network by way of the interface involves logging on to the remote network in accordance with the authentication mechanism.

In some embodiments, the definition of the interface for accessing the remote network includes at least part of a uniform resource locator (URL).

In some embodiments, the definition of the discoverable set of computing resources includes a geographic region in which discoverable set of computing resources are disposed.

In some embodiments, the descriptions of the discoverable set of computing resources is received in a complex data object (e.g., XML, JSON, YAML, etc.) and the definition of the discoverable set of computing resources includes path within the complex data object in which the descriptions of the discoverable set of computing resources are located.

In some embodiments, the one or more processors are configured to generate one or more graphical user interfaces with data entry elements for information in the specification related to the remote network, provide, to a client device associated with the managed network the one or more graphical user interfaces, receive, from the client device and entered by way of the data entry elements, the information in the specification related to the remote network, and store, in the persistent storage, the information in the specification related to the remote network.

In some embodiments, a system may involve means for obtaining, by a provider-neutral cloud discovery software application, a specification related to a remote network. The provider-neutral cloud discovery software application may be executable on one or more processors disposed within a computational instance of a remote network management platform. The computational instance may be dedicated to a managed network. Additionally, persistent storage disposed within the computational instance may contain representations of discovered configuration items related to the managed network in database tables. Further, the specification may define an interface for accessing the remote network, a discoverable set of computing resources of a computing service provided by the remote network, and mappings between (i) descriptions of the discoverable set of computing resources, and (ii) fields of the database tables. The system may also involve means for logging on to, by the provider-neutral cloud discovery software application, the remote network by way of the interface. The system may additionally involve means for requesting and receiving, by the provider-neutral cloud discovery software application from the remote network, the descriptions of the discoverable set of computing resources. The system may further involve means for storing, by the provider-neutral cloud discovery software application, in the fields of the database tables, the descriptions of the discoverable set of computing resources in accordance with the mappings.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims

What is claimed is:

1. A computing system comprising:
   persistent storage disposed within a computational instance of a remote network management platform, the persistent storage containing representations of discovered configuration items related to a managed network in database tables, wherein the computational instance is dedicated to the managed network; and
   one or more processors implementing the computational instance and configured to cause a provider-neutral cloud discovery software application to perform operations including:
   obtaining a specification related to a remote network, wherein the remote network is outside the managed network and the specification defines an interface for accessing the remote network, wherein the remote network is a cloud-based network that provides cloud services to the managed network, a discoverable set of computing resources of a computing service provided by the remote network, and mappings between (i) descriptions of the discoverable set of computing resources, and (ii) fields of the database tables;
   obtaining an authentication script from the specification;
   logging on to the remote network by way of the interface, comprising executing the authentication script;
   requesting and receiving, from the remote network, the descriptions of the discoverable set of computing resources; and
   storing, in the fields of the database tables, the descriptions of the discoverable set of computing resources in accordance with the mappings.

2. The computing system of claim 1, wherein the provider-neutral cloud discovery software application performs operations including:
   obtaining a second specification related to the remote network, wherein the second specification defines the interface for accessing the remote network, a second discoverable set of computing resources of a second computing service provided by the remote network, and second mappings between (i) descriptions of the second discoverable set of computing resources, and (ii) the fields of the database tables;
   logging on to the remote network by way of the interface;
   requesting and receiving, from the remote network, the descriptions of the second discoverable set of computing resources; and
   storing, in the fields of the database tables, the descriptions of the second discoverable set of computing resources in accordance with the second mappings.

3. The computing system of claim 1, wherein the provider-neutral cloud discovery software application performs operations including:
   obtaining a second specification related to a second remote network, wherein the second specification defines a second interface for accessing the second remote network, a second discoverable set of computing resources of a second computing service provided by the second remote network, and second mappings between (i) descriptions of the second discoverable set of computing resources, and (ii) the fields of the database tables;
   logging on to the second remote network by way of the second interface;
   requesting and receiving, from the remote network, the descriptions of the second discoverable set of computing resources; and
   storing, in the fields of the database tables, the descriptions of the second discoverable set of computing resources in accordance with the second mappings.

4. The computing system of claim 1, wherein the remote network is physically distinct from the remote network management platform and the managed network, and wherein the remote network management platform and the managed network both access the remote network by way of a wide-area network.

5. The computing system of claim 1, wherein the specification defines an authentication mechanism for the remote network, and wherein logging on to the remote network by way of the interface comprises logging on to the remote network in accordance with the authentication mechanism.

6. The computing system of claim 1, wherein the definition of the interface for accessing the remote network includes at least part of a uniform resource locator (URL).

7. The computing system of claim 1, wherein the descriptions of the discoverable set of computing resources is received in a complex data object, wherein the definition of the discoverable set of computing resources includes path within the complex data object in which the descriptions of the discoverable set of computing resources are located.

8. The computing system of claim 7, wherein the complex data object is formatted in accordance with JavaScript Object Notation (JSON) or eXtensible Markup Language (XML).

9. The computing system of claim 1, wherein the one or more processors are configured to:
   generate one or more graphical user interfaces with data entry elements for information in the specification related to the remote network;
   provide, to a client device associated with the managed network the one or more graphical user interfaces;
   receive, from the client device and entered by way of the data entry elements, the information in the specification related to the remote network; and
   store, in the persistent storage, the information in the specification related to the remote network.

10. The computing system of claim 1, wherein the operations performed by the provider-neutral cloud discovery software application comprise:
    obtaining one or more cloud API scripts from the specification, wherein each of the one or more cloud API scripts is associated with a respective cloud API action; and
    executing the one or more cloud API scripts to discover cloud services on the remote network.

11. A computer-implemented method comprising:
    obtaining, by a provider-neutral cloud discovery software application, a specification related to a remote network, wherein the provider-neutral cloud discovery software application is executable on one or more processors implementing a computational instance of a remote network management platform, wherein the computational instance is dedicated to a managed network, wherein persistent storage disposed within the computational instance contains representations of discovered configuration items related to the managed network in database tables, wherein the remote network is outside the managed network, and wherein the specification defines an interface for accessing the remote network, wherein the remote network is a cloud-based network that provides cloud services to the managed network, a discoverable set of computing resources of a computing service provided by the remote network, and mappings between (i) descriptions of the discoverable set of computing resources, and (ii) fields of the database tables;

obtaining an authentication script from the specification;

logging on to, by the provider-neutral cloud discovery software application, the remote network by way of the interface, wherein logging on to the remote network comprises executing the authentication script;

requesting and receiving, by the provider-neutral cloud discovery software application and from the remote network, the descriptions of the discoverable set of computing resources; and storing, by the provider-neutral cloud discovery software application and in the fields of the database tables, the descriptions of the discoverable set of computing resources in accordance with the mappings.

12. The computer-implemented method of claim 11, comprising:

obtaining, by the provider-neutral cloud discovery software application, a second specification related to the remote network, wherein the second specification defines the interface for accessing the remote network, a second discoverable set of computing resources of a second computing service provided by the remote network, and second mappings between (i) descriptions of the second discoverable set of computing resources, and (ii) the fields of the database tables;

logging on to, by the provider-neutral cloud discovery software application, the remote network by way of the interface;

requesting and receiving, by the provider-neutral cloud discovery software application and from the remote network, the descriptions of the second discoverable set of computing resources; and storing, by the provider-neutral cloud discovery software application and in the fields of the database tables, the descriptions of the second discoverable set of computing resources in accordance with the second mappings.

13. The computer-implemented method of claim 11, comprising:

obtaining, by the provider-neutral cloud discovery software application, a second specification related to a second remote network, wherein the second specification defines a second interface for accessing the second remote network, a second discoverable set of computing resources of a second computing service provided by the second remote network, and second mappings between (i) descriptions of the second discoverable set of computing resources, and (ii) the fields of the database tables;

logging on to, by the provider-neutral cloud discovery software application, the second remote network by way of the second interface;

requesting and receiving, by the provider-neutral cloud discovery software application and from the remote network, the descriptions of the second discoverable set of computing resources; and storing, by the provider-neutral cloud discovery software application and in the fields of the database tables, the descriptions of the second discoverable set of computing resources in accordance with the second mappings.

14. The computer-implemented method of claim 11, wherein the remote network is physically distinct from the remote network management platform and the managed network, and wherein the remote network management platform and the managed network both access the remote network by way of a wide-area network.

15. The computer-implemented method of claim 11, wherein the specification defines an authentication mechanism for the remote network, and wherein logging on to the remote network by way of the interface comprises logging on to the remote network in accordance with the authentication mechanism.

16. The computer-implemented method of claim 11, wherein the definition of the interface for accessing the remote network includes at least part of a uniform resource locator (URL).

17. The computer-implemented method of claim 11, wherein the descriptions of the discoverable set of computing resources is received in a complex data object, wherein the definition of the discoverable set of computing resources includes path within the complex data object in which the descriptions of the discoverable set of computing resources are located.

18. The computer-implemented method of claim 11, wherein the one or more processors are configured to:

generate one or more graphical user interfaces with data entry elements for information in the specification related to the remote network;

provide, to a client device associated with the managed network, the one or more graphical user interfaces;

receive, from the client device and entered by way of the data entry elements, the information in the specification related to the remote network; and store, in the persistent storage, the information in the specification related to the remote network.

19. An article of manufacture including a non-transitory computer-readable medium, having stored thereon program instructions that, upon execution by one or more processors implementing a computational instance of a remote network management platform, cause the one or more processors to perform operations comprising:

obtaining, by a provider-neutral cloud discovery software application, a specification related to a remote network, wherein the provider-neutral cloud discovery software application is executable on the one or more processors, wherein the computational instance is dedicated to a managed network, wherein persistent storage disposed within the computational instance contains representations of discovered configuration items related to the managed network in database tables, wherein the remote network is outside the managed network, and wherein the specification defines an interface for accessing the remote network, wherein the remote network is a cloud-based network that provides cloud services to the managed network, a discoverable set of computing resources of a computing service provided by the remote network, and mappings between (i) descriptions of the discoverable set of computing resources, and (ii) fields of the database tables;

obtaining an authentication script from the specification;

logging on to, by the provider-neutral cloud discovery software application, the remote network by way of the interface, wherein logging on to the remote network comprises executing the authentication script;

requesting and receiving, by the provider-neutral cloud discovery software application and from the remote network, the descriptions of the discoverable set of computing resources; and storing, by the provider-neutral cloud discovery software application and in the fields of the database tables, the descriptions of the discoverable set of computing resources in accordance with the mappings.

* * * * *